US007887450B2

(12) United States Patent
Fusegi et al.

(10) Patent No.: US 7,887,450 B2
(45) Date of Patent: Feb. 15, 2011

(54) CLUTCH DEVICE AND DIFFERENTIAL DEVICE THEREWITH

(75) Inventors: Masaaki Fusegi, Shimotsuga-gun (JP); Noriyuki Sudou, Kanuma (JP)

(73) Assignee: GKN Driveline Torque Technology KK, Tochigi-shi, Tochigi-ken (JP)

( * ) Notice: Subject to any disclaimer, the term of this patent is extended or adjusted under 35 U.S.C. 154(b) by 153 days.

(21) Appl. No.: 11/698,568

(22) Filed: Jan. 25, 2007

(65) Prior Publication Data

US 2007/0179008 A1 Aug. 2, 2007

(30) Foreign Application Priority Data

Jan. 31, 2006 (JP) .............................. 2006-023488
Apr. 27, 2006 (JP) .............................. 2006-124075
Jul. 4, 2006 (JP) .............................. 2006-184255

(51) Int. Cl.
*F16H 48/30* (2006.01)
(52) U.S. Cl. ...................... 475/150; 475/231; 192/84.96
(58) Field of Classification Search ................. 475/150, 475/231; 192/84.96, 84.93, 35
See application file for complete search history.

(56) References Cited

U.S. PATENT DOCUMENTS

| 4,733,577 | A * | 3/1988 | Griesser et al. ............. 475/150 |
| 6,206,159 | B1 * | 3/2001 | Takuno et al. ................ 192/35 |
| 6,436,002 | B1 * | 8/2002 | Ishikawa et al. ............ 475/231 |
| 6,582,336 | B2 * | 6/2003 | Forrest et al. ............... 475/150 |
| 6,698,562 | B2 * | 3/2004 | Kato et al. ..................... 192/35 |
| 6,796,412 | B2 * | 9/2004 | Teraoka ....................... 192/35 |
| 6,851,535 | B2 * | 2/2005 | Nakaba et al. ................ 192/35 |
| 7,144,347 | B2 * | 12/2006 | Kushino ..................... 475/249 |
| 2002/0066632 | A1 * | 6/2002 | Kristen et al. ............. 192/17 C |
| 2002/0125096 | A1 * | 9/2002 | Yamazaki et al. ............. 192/35 |
| 2003/0019709 | A1 * | 1/2003 | Katou ......................... 192/35 |
| 2005/0023099 | A1 * | 2/2005 | Sakurai et al. ................ 192/35 |
| 2005/0167225 | A1 * | 8/2005 | Sakai et al. ................... 192/35 |
| 2005/0187063 | A1 * | 8/2005 | Haruki ....................... 475/231 |
| 2005/0277510 | A1 * | 12/2005 | Fusegi et al. ................ 475/231 |

FOREIGN PATENT DOCUMENTS

JP 2004-183874 7/2004

* cited by examiner

*Primary Examiner*—David D Le
*Assistant Examiner*—Justin Holmes
(74) *Attorney, Agent, or Firm*—Morrison & Foerster LLP

(57) ABSTRACT

A clutch device is combinable with a rotating device rotating about an axis. The clutch device is provided with a clutch rotatable with the rotating device, a plunger for disengageably engage the clutch, a solenoid for generating a magnetic flux for driving the plunger, a magnetic core slidably fitting on a portion of the rotating device and incompletely enclosing the solenoid to expose the solenoid to the portion, and a support member configured to support the magnetic core to fit with the rotating device in an axial direction along the axis. The magnetic core in combination with the portion of the rotating device and the plunger is so dimensioned as to enclose the solenoid.

11 Claims, 18 Drawing Sheets

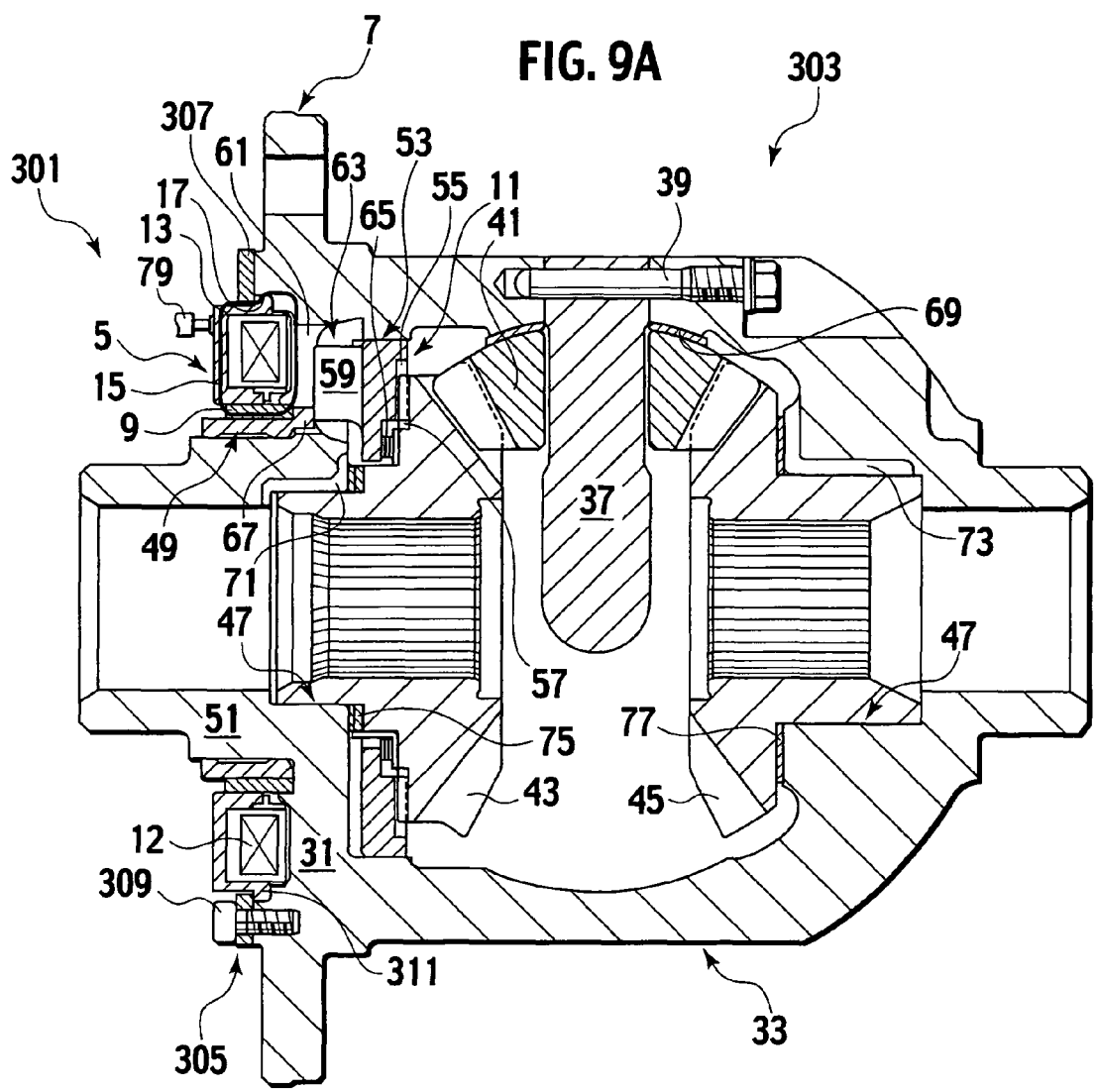
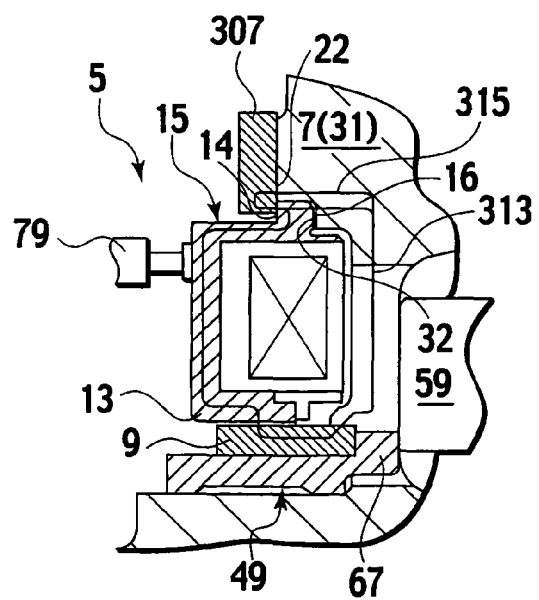

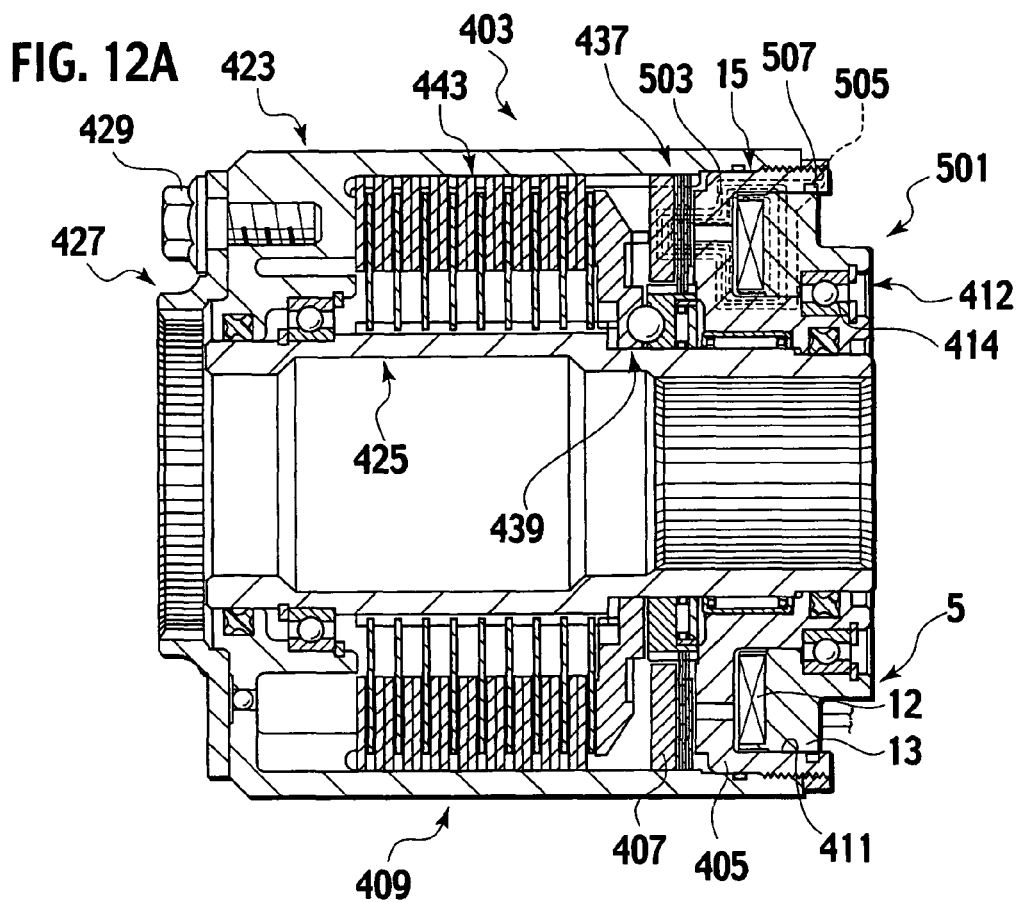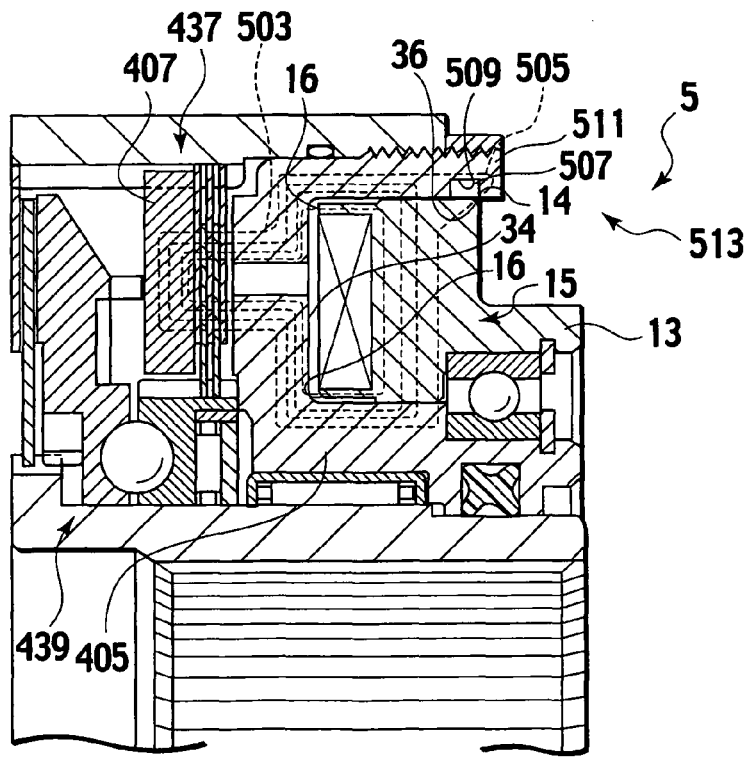

CLUTCH DEVICE AND DIFFERENTIAL DEVICE THEREWITH

CROSS-REFERENCE TO RELATED APPLICATIONS

This application is based upon and claims the benefit of priority from the prior Japanese Patent Applications No. 2006-023488 (filed Jan. 31, 2006), No. 2006-124075 (filed Apr. 27, 2006) and No. 2006-184255 (filed Jun. 4, 2006); the entire contents of which are incorporated herein by reference.

BACKGROUND OF THE INVENTION

1. Field of the Invention

The present invention relates to a clutch device and a differential device therewith applied to conveyance means such as automobiles.

2. Description of the Related Art

As is known, an automobile is equipped with a differential to distribute a driving force of an engine to right and left output axles. The differential allows a differential motion between the axles and hence maintains traction of wheels with the road while the automobile is turning.

There are proposed various variations of differentials, such as a so-called "Lock-up Differential" and a so-called "Free-Running Differential" for example. The lock-up differential enables a temporary lock of the differential motion. The free-running differential enables cut off in power transmission therein from the engine to the axles so as to have the axles to freely run.

Any of these differentials requires a clutch device combined therewith to provide a controllable switch between lock and unlock, or between cut-off and transmission. Combination of a differential and a clutch device continues to be a challenging technical issue because a linear motion must be given from the exterior to the clutch device rotating with the differential to switch the clutch device. Such combination in general requires a complex system, which usually leads to increase in size and energy loss of the differential if considered as a total system.

SUMMARY OF THE INVENTION

The present invention is intended for providing a clutch device capable of being integrated in a differential device and a differential device with a clutch device integrated therein, which provide a total compactness and a small energy loss.

In accordance with an aspect of the present invention, a clutch device is combinable with a rotating device rotating about an axis. The clutch device is provided with a clutch rotatable with the rotating device, a plunger for disengageably engage the clutch, a solenoid for generating a magnetic flux for driving the plunger, a magnetic core slidably fitting on a portion of the rotating device and incompletely enclosing the solenoid to expose the solenoid to the portion, and a support member configured to support the magnetic core to fit with the rotating device in an axial direction along the axis. The magnetic core in combination with the portion of the rotating device and the plunger is so dimensioned as to surround the solenoid.

Preferably, the support member includes a latching piece latching with any of the magnetic core and the rotating device. Preferably, the support member includes a repulsive member to urge the magnetic core toward the rotating device. Preferably, the solenoid includes an anti-rotating member engagable with an external stationary member to prevent the solenoid from rotating. Preferably, the solenoid is so arranged as to deliver the magnetic flux to the portion of the rotating device. Preferably, the magnetic core and the solenoid are so arranged as to directly face the solenoid to the portion of the rotating device in the axial direction. Preferably, the support member is so arranged as to branch the magnetic flux into a first flux path and a second flux path so as to cancel forces generated by the first and second flux paths on the solenoid. Preferably, the support member is so arranged as to branch the magnetic flux into a first flux path directly conducted to the portion and a second flux path routed to the support member. Preferably, the magnetic core includes a projection formed on an outer periphery of the core, the projection having a first end and a second end to branch the magnetic flux into a first flux conducted through the first end and a second flux conducted through the second end. Preferably, the clutch device is further provided with a chamber defined by the solenoid and the rotating member to branch the magnetic flux into a first flux conducted through the first end and a second flux conducted through the second end.

In accordance with another aspect of the present invention, a differential device for differentially distributing a driving force to axles is provided with a differential gear set as the aforementioned rotating device, and the aforementioned clutch device combined with the differential gear set. The clutch device can be applied to any of unlockable lock of a differential motion of the differential gear set and intermissive transmission of the driving force to the axles.

BRIEF DESCRIPTION OF THE DRAWINGS

FIG. 1 illustrates a state of freely differential motion and FIG. 2 illustrates a differential-lock state;

FIG. 9A is a sectional view of a differential device in accordance with a third embodiment of the present invention, which is drawn as correspondent to FIG. 1 and taken from a line VII-VII of FIG. 10;

FIG. 9B is a magnified sectional view of the differential device with respect to a solenoid and its proximity;

FIGS. 12A and 12B are sectional views of a differential device in accordance with a modification of the fifth embodiment, where FIGS. 12A and 12B are respectively correspondent to FIGS. 11A and 11B;

DETAILED DESCRIPTION OF THE PREFERRED EMBODIMENT

Certain embodiments of the present invention will be described hereinafter with reference to the appended drawings. Throughout the specification, claims and the drawings, an axial direction means a direction along an axis of a differential device unless any other particular descriptions are given. The axial direction is generally correspondent to lateral directions of FIGS. 1, 6, 7, 9, 11-13, 17 and 18.

Clutch devices in accordance with the following embodiments can be combined with various types of differential gear sets. The following description gives some particular examples of such combinations but not limited thereto.

First Embodiment

FIGS. 1-5 illustrates a differential device 3 in accordance with a first embodiment of the present invention. In the following description, the right and the left are correspondent to those of FIGS. 1 and 2. In the present embodiment, a clutch device is used to lock and unlock differential motion of a differential.

The differential device 3 is provided with a differential gear set 33 of a bevel gear type so as to differentially transmit a driving force of an engine from a differential case 7 to right and left axles linked with side gears, a clutch device 1 for locking (or limiting) the differential motion of the differential gear set 33, and a controller (not shown) for controlling the clutch device 1. Of course, the differential gear set is not limited to the bevel gear type but may use any other types such as a coupling type.

Figure 1:
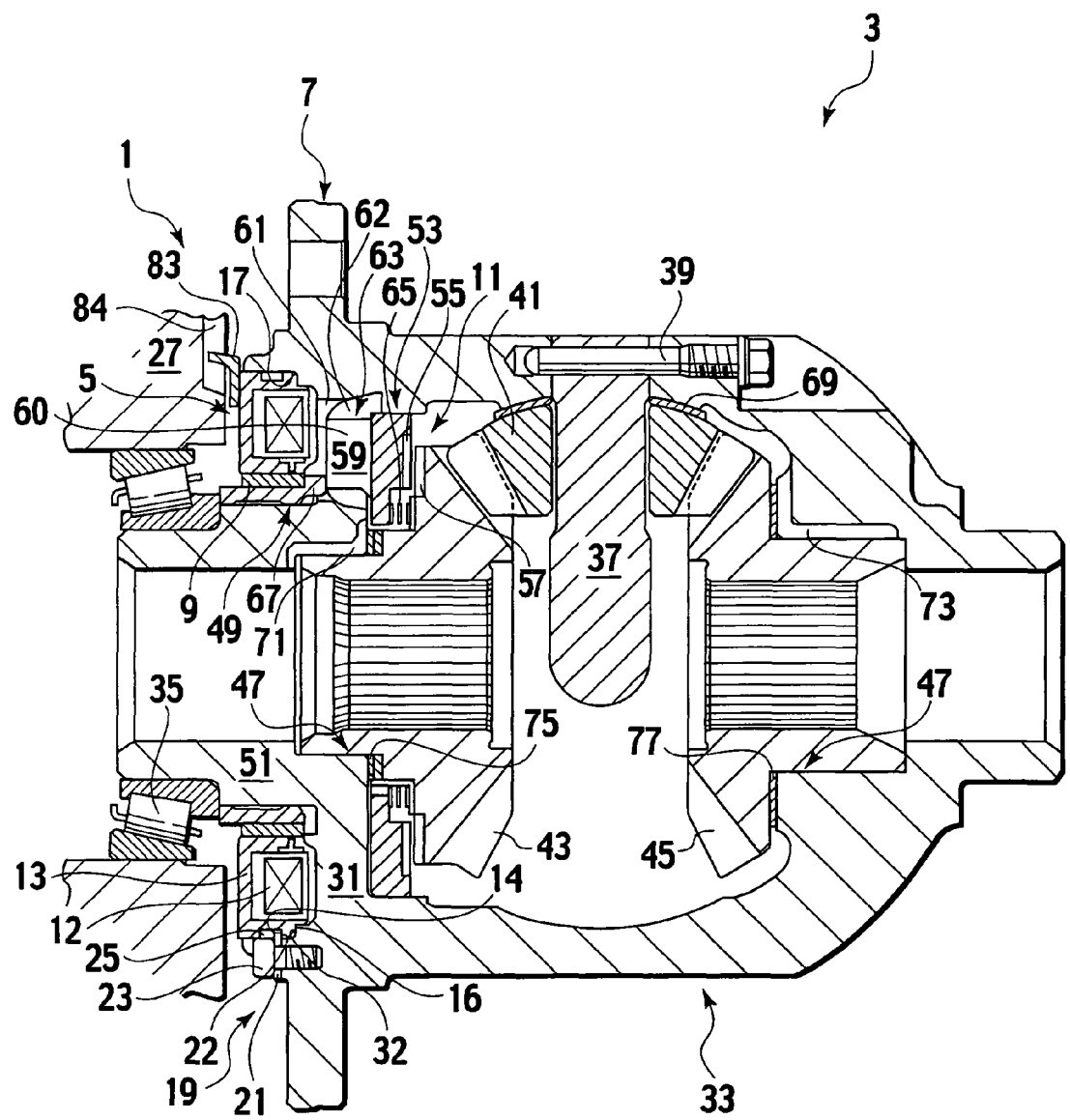
FIGS. 1 and 2 are sectional views of a differential device in accordance with a first embodiment of the present invention, as being taken from a line I-I of FIG. 3; where
Figure 2:
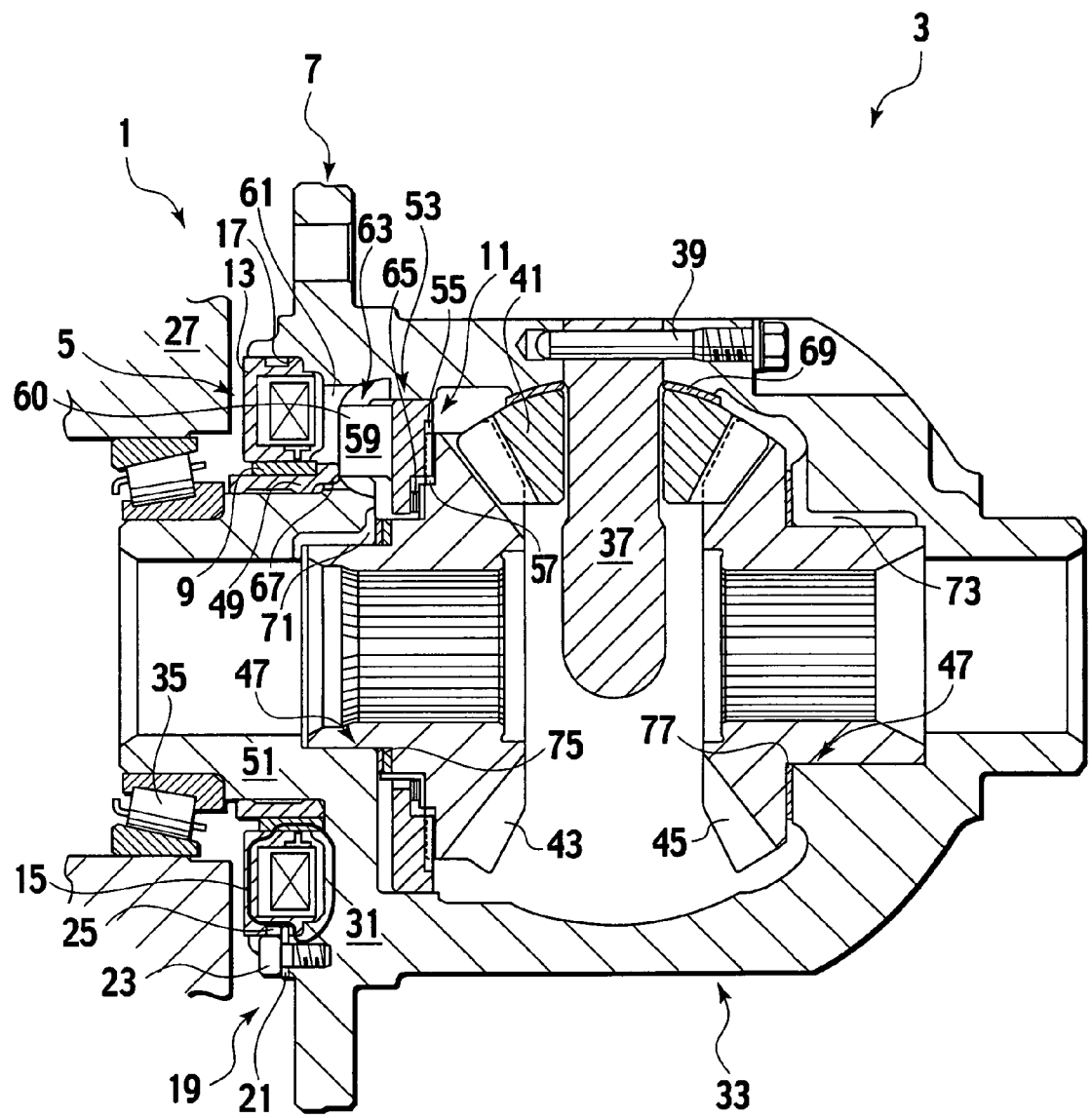

Referring to FIGS. 1 and 2, the clutch device 1 is generally composed of an electromagnetic actuator and a dog clutch operated by the actuator. The actuator is provided with an anti-rotating solenoid 5 and an axially movable plunger 9 driven by the solenoid 5. The solenoid 5 generates a magnetic flux 15 penetrating a core 13 thereof into the plunger 9, when excited. The plunger 9 is thereby driven in the axial direction to drive the dog clutch 11 from a disengaging state into an engaging state. When the dog clutch 11 is in the engaging state, the differential motion of the differential gear set 33 is locked.

The differential case 7 is provided with a support portion 17 formed to be a circular internal periphery thereof, which slidingly fits on and supports the core 13 of the solenoid 5 in a radial direction. The core 13 is further supported by a support means 19 of the differential case 7 in the axial direction. The support means 19 is provided with plural (three in this example) sets of plates 21 for engagement with the solenoid 5, and pairs of bolts 23 for fixation of the plates 21 to the differential case 7. The core 13 of the solenoid 5 has a circular slit 25 for reduction of resistance for oil. The engagement of the plates 21 is made on the slit 25. The fixation of the plates 21 to the differential case 7 may be made by welding instead of the bolts 23.

Figure 3:
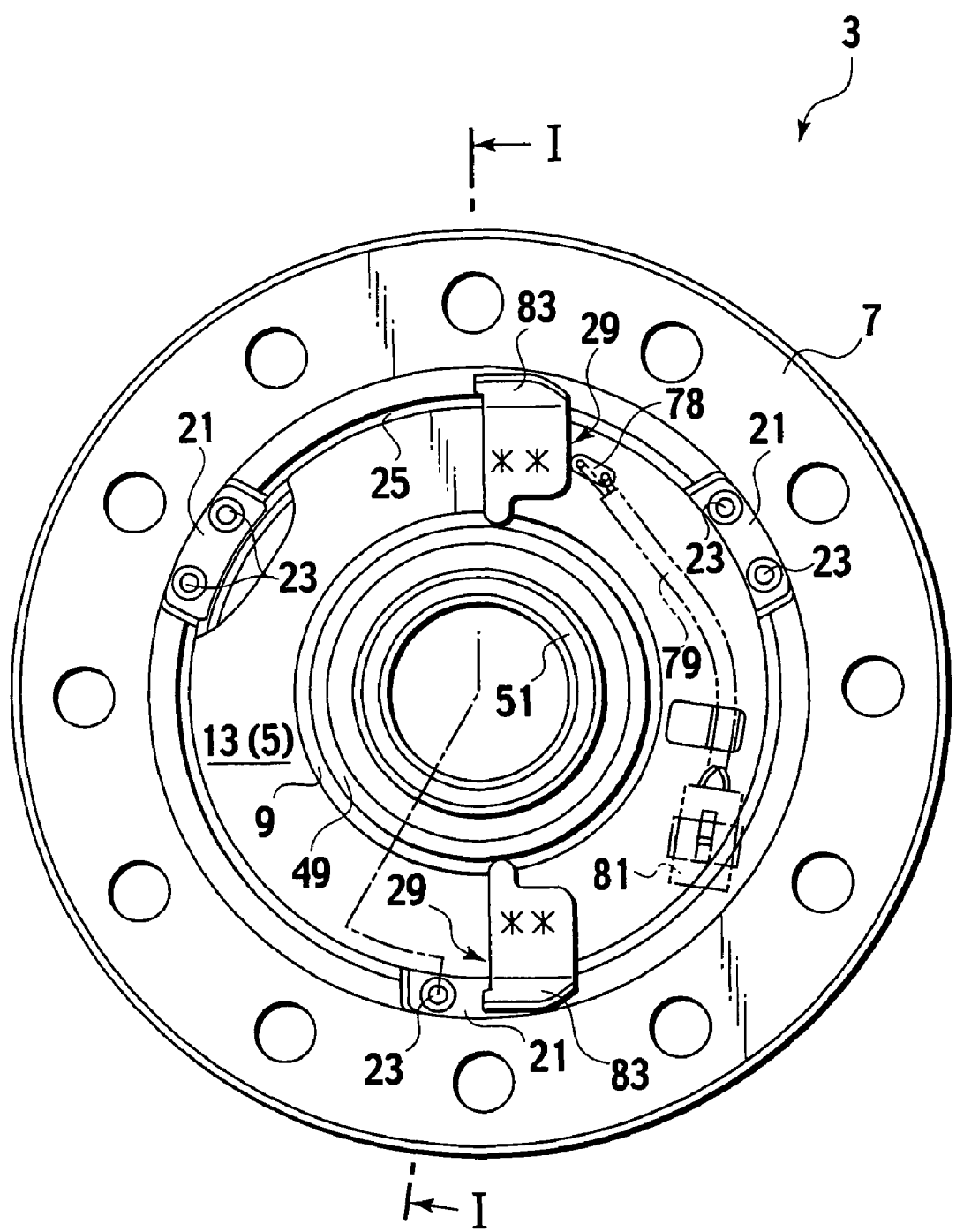
FIG. 3 is a side view of the differential device viewed from the left of FIGS. 1 and 2.

Referring to FIG. 3, the core 13 of the solenoid 5 has anti-rotation members 29 for anti-rotation of the solenoid 5, which are spot-welded with the core 13. Each anti-rotation member 29 has a latching piece 83 projecting obliquely outward in the radial direction. Latching pieces 83 respectively latch with recesses 84 formed on a differential carrier 27 so that the solenoid 5 is made anti-rotated.

Referring again to FIGS. 1 and 2, the core 13 incompletely encloses a winding 12 of the solenoid 5 and radially spans the support portion 17 of the differential case 7 and the plunger 9. The core 13 in combination with the differential case 7 and the plunger 9 substantially completely encloses the winding. Thereby, the magnetic flux 15 generated by the solenoid 5 is conducted via the core 13 to a portion 31 of a side wall of the differential case 7, where the solenoid 5 adjoins, and the plunger 9 so as to takes a form of a loop as shown in FIG. 2. In the strict sense, where a radially outer end of the core 13 adjoins the support portion 17, the magnetic flux 15 branches into two flux paths, namely a first flux path via an outwardly projecting end 14 of the core 13 to an inner end 22 of the plate 21 and a second flux path via an axial end 16 of the core 13 to an end face 32 of the differential case 7.

The differential gear set 33 is provided with the differential case 7, pinion shafts 37, pinion gears 41, and a pair of side gears 43 and 45. The differential case 7 is supported by the differential carrier 27 with bearings 35 intervening therebetween for smooth rotation. The differential case 7 supports the pinion shafts 37 in radial directions therein and bolts 39 respectively prevent the pinion shafts 37 from displacing. The pinion shafts 37 respectively rotatably supports pinion gears 41. The side gears 43 and 45 engage with the pinion gears 41 from respectively left and right sides. Internal surfaces of the side gears 43 and 45 are splined so as to drivingly engage with left and right axles. Thereby, when the engine of the automobile drives the differential case 7, the driving force is differentially distributed to the left and right axles via the side gears 43 and 45.

Figure 4:
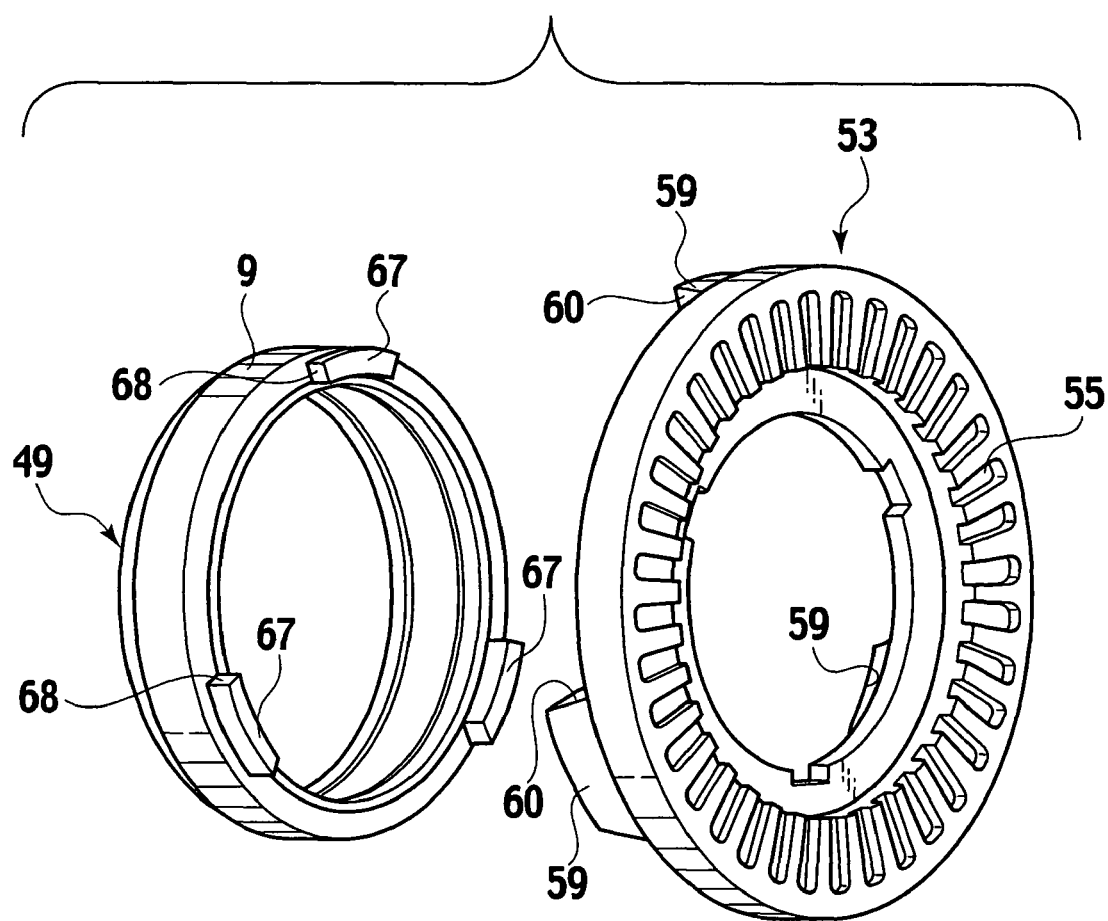
FIG. 4 is a perspective view of a plunger and a clutch ring for the differential device.
Figure 5:
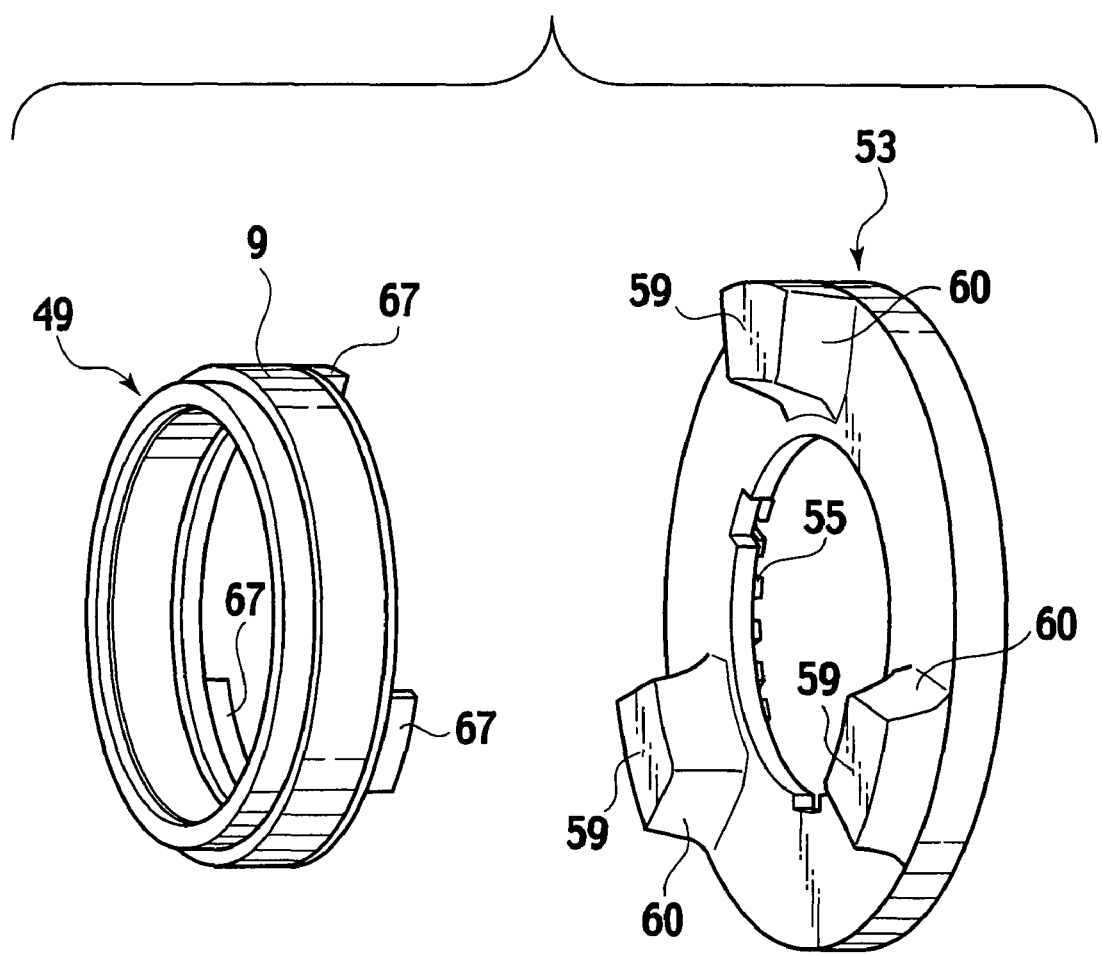
FIG. 5 is another perspective view of the plunger and the clutch ring.

Referring to FIGS. 4 and 5 in combination with FIGS. 1 and 2, a ring 49 made of a non-magnetic material fits with the plunger 9 so as to intervene between the plunger 9 and a left boss portion 51. The plunger 9 and the ring 49 movably fit on the left boss portion 51 and unitarily movable in the axial direction. By non-magnetism of the ring 49, the magnetic flux 15 is prevented from leaking to the left boss portion 51. The ring 49 has projections 67 projecting in the axial direction toward the differential gear set 33. Correspondingly the differential case 7 has openings 61, to which the projections 67 are loosely and slidably inserted. Side faces 68 in the rotational direction of the projections 67 abut on peripheries of the openings 61 so that the ring 49 is rotated unitarily with the differential case 7. The core 13 and the solenoid 5 are supported by the support means 19 of the differential case 7 in the axial direction as described above.

As facing to the left side gear 43, a clutch ring 53 having teeth 55 is provided. Correspondingly the left side gear 43 is provided with teeth 57. These teeth 55 and 57 compose the dog clutch 11 for locking and unlocking the differential motion of the differential gear set 33. The clutch ring 53 is supported by the internal periphery of the differential case 7 to be axially movable. The clutch ring 53 is provided with projections 59 as facing to the projections 67 of the ring 49, which also slidably engage with the openings 61 of the differential case 7 so that the clutch ring 53 is rotated unitarily with the differential case 7.

As the projections 59 respectively face to the projections 67, axial motion of the plunger 9 toward the dog clutch 11 (rightward in FIGS. 1 and 2) is transmitted to the dog clutch 11 via the butted projections 59 and 67 so that the dog clutch 11 is made engaged.

Side faces 60 of the projections 59 are formed obliquely to the rotation direction. The openings 61 also have oblique cam faces 62 as correspondent to the oblique faces 60. A combination of the side faces 60 of the projections 59 and the cam faces 62 of the openings 61 compose a cam 63 for converting torque of the differential case 7 into an axial force on the clutch ring 53 to assist the engagement of the dog clutch 11. As opposed to the engagement force on the dog clutch 11, a return spring 65 repulsively intervenes between the clutch ring 53 and the left side gear 43. Thereby, the dog clutch 11 stays in a disengaging state unless an engaging driving force is given.

The differential carrier 27 is provided with oil reservoirs, though not shown in the drawing, to supply lubrication oil to the exterior and the interior of the differential device 3. The differential case 7 has openings so dimensioned that the gears 41, 43 and 45 are inserted therein. The oil flows out of and into these openings of the differential case 7 to lubricate and cool meshing portions of these gears and any contact faces, such as contact faces 47 among the differential case 7 and the side gears 43 and 45, contact faces around washers 75 and 77 and spherical washers 69. For ease of circulation of the oil, an oil flow path 71 is held between the left side gear 43 and the differential case 7 and also an oil flow path 73 is held between the right side gear 45 and the differential case 7.

Referring again to FIG. 3, a lead line 79 is led out of the solenoid 5 via a tight plug 78 and further conducted out of the differential carrier 27 via a connector 81. The lead line 79 links with a battery via a controller so that the controller controls excitation of the solenoid 5.

When the solenoid 5 is excited, the generated magnetic flux 15 drives the plunger 9 in the axial direction to drive the dog clutch 11 from a disengaging state into an engaging state. Thereby, the differential motion of the differential gear set 33 is locked. Then the cam 63 converts torque of the differential case 7 into an axial force for pressing the clutch ring 53 toward the left side gear 43 so that the engagement of the dog clutch 11 is prevented from being cancelled by shock or such. When excitation is cancelled, the return spring 65 returns the plunger 9 leftward in FIG. 1 so that the engagement of the dog clutch 11 and the lock of the differential motion are cancelled.

Second Embodiment

Figure 6:
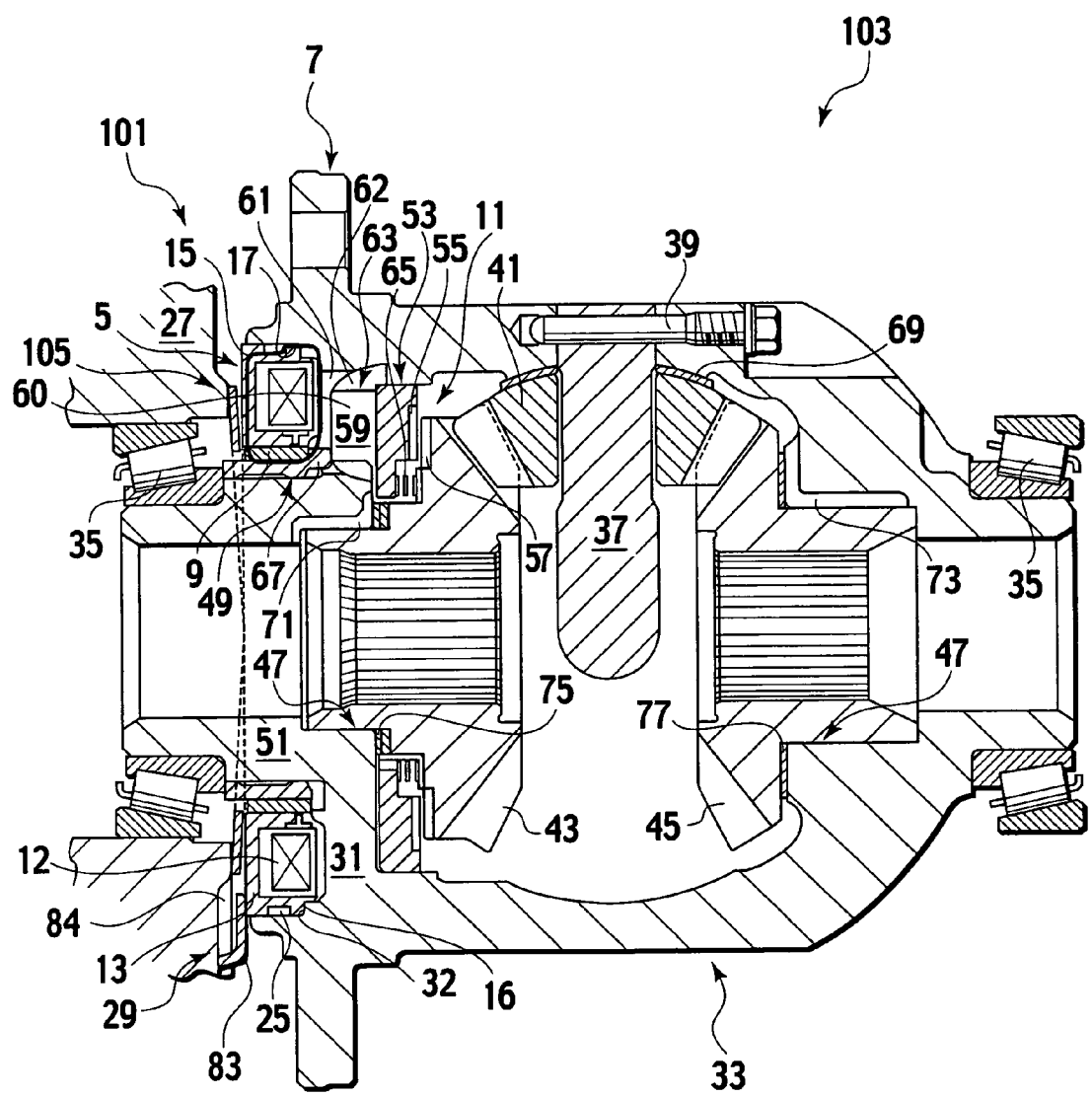
FIG. 6 is a sectional view of a differential device in accordance with a second embodiment of the present invention, which is drawn as correspondent to FIG. 1.

A second embodiment as illustrated in FIG. 6 also embodies the present invention. In the following description, substantially the same elements as any of the aforementioned elements are referred with the same numerals and detailed descriptions thereof will be omitted or simplified.

Referring to FIG. 6, a differential device 103 in accordance with the second embodiment of the present invention is provided with a clutch device 101 and a differential gear set 33, differential motion of which is controlled by the clutch device 101, and a controller (not shown) for controlling the clutch device 101.

The differential gear set 33 is provided with a differential case 7 supported by a differential carrier 27 with bearings 35 intervening therebetween, pinion shafts 37 supported by the differential case 7, pinion gears 41 rotatably supported by the pinion shafts 37, and a pair of side gears 43 and 45 engaging with the pinion gears 41. The differential gear set 33 differentially distribute an driving force given to the differential case 7 to left and right axles respectively in splined engagement with the left and right side gears 43 and 45.

The clutch device 101 in accordance with the second embodiment is provided with an anti-rotating solenoid 5, an axially movable plunger 9 driven by the solenoid 5, and a dog clutch 11 operated by the plunger 9. The solenoid 5 is provided with a core 13 incompletely enclosing a winding 12 of the solenoid 5 and radially spanning a support portion 17 of the differential case 7 and the plunger 9. The core 13 in combination with a side wall of the differential case 7 and the plunger 9 substantially completely encloses the winding to generate a magnetic flux 15 taking a form of a loop therethrough. When the solenoid 5 is excited, the magnetic flux 15 drives the plunger in the axial direction to drive the dog clutch 11 from a disengaging state into an engaging state, in which the differential motion of the differential gear set 33 is locked.

The differential case 7 has a support portion 17 which slidingly fits on and supports the core 13 of the solenoid 5 in a radial direction. Anti-rotation members 29 respectively having latching pieces 83 are spot-welded with the core 13 and the latching pieces 83 latch with recesses formed on the differential carrier 27 so that the solenoid 5 is made anti-rotated.

A support means 105 intervenes between the differential carrier 27 and the core 13. The support means 105 is a semi-circular leaf spring having as light curvature to be a conical shape so as to make a repulsive force in the axial direction. Some spots on an inner edge of the support means 105 are spot-welded with the core 13 and an outer edge thereof is in contact with the differential carrier 27. The core 13 is supported in the axial direction by means of the repulsive force on the core 13 toward the differential case 7.

When the solenoid 5 is excited, the generated magnetic flux 15 drives the plunger 9 in the axial direction to drive the dog clutch 11 from a disengaging state into an engaging state. Thereby, the differential motion of the differential gear set 33 is locked. Then a cam 63 converts torque of the differential case 7 into an axial force for pressing a clutch ring 53 toward the left side gear 43 so that the engagement of the dog clutch 11 is prevented from being cancelled by shock or such. When excitation is cancelled, a return spring 65 returns the plunger 9 leftward in FIG. 1 so that the engagement of the dog clutch 11 and the lock of the differential motion are cancelled.

Third Embodiment

Figure 7:
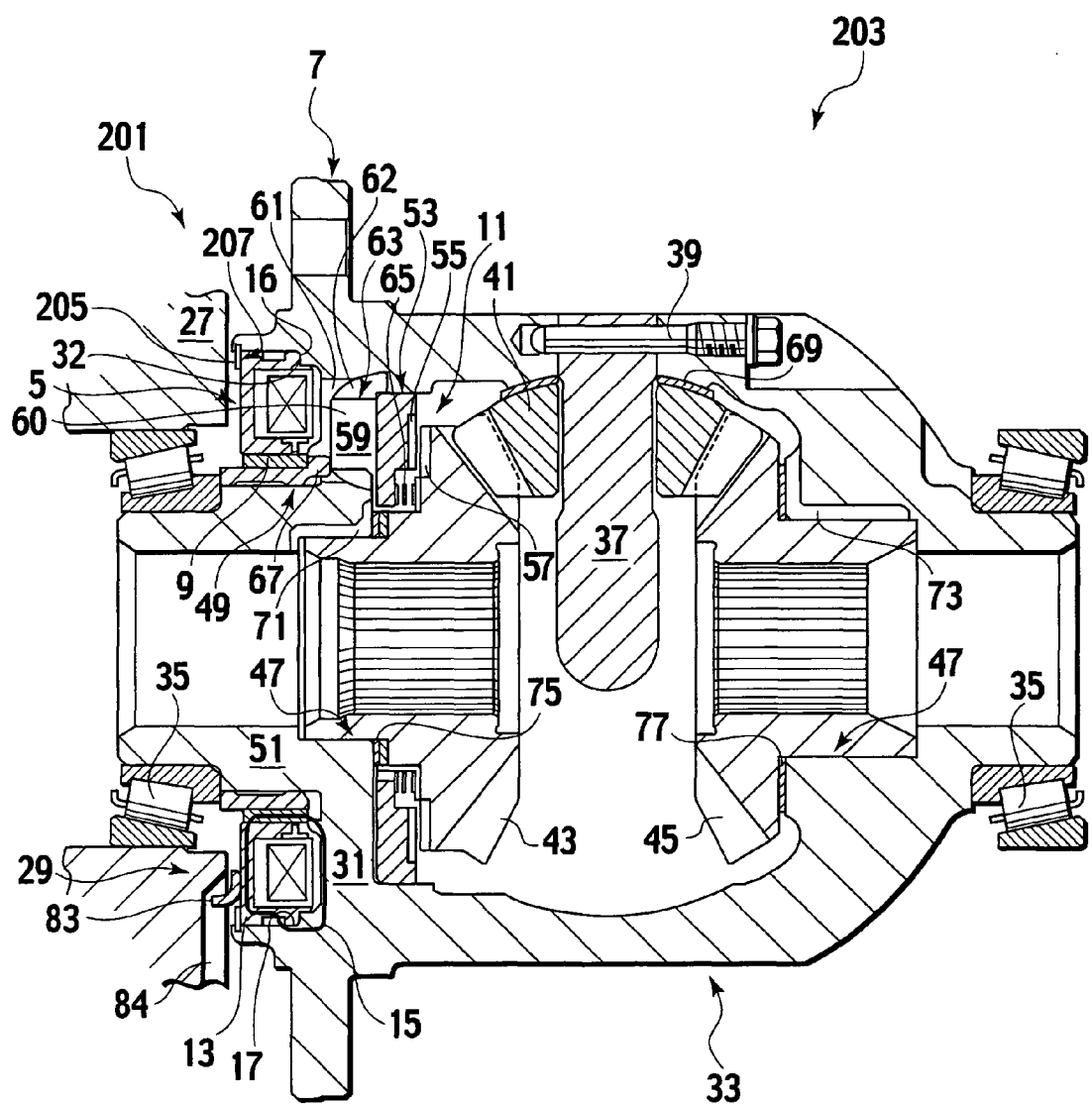
FIG. 7 is a sectional view of a differential device in accordance with a third embodiment of the present invention, which is drawn as correspondent to FIG. 1 and taken from a line VII-VII of FIG. 8.
Figure 8:
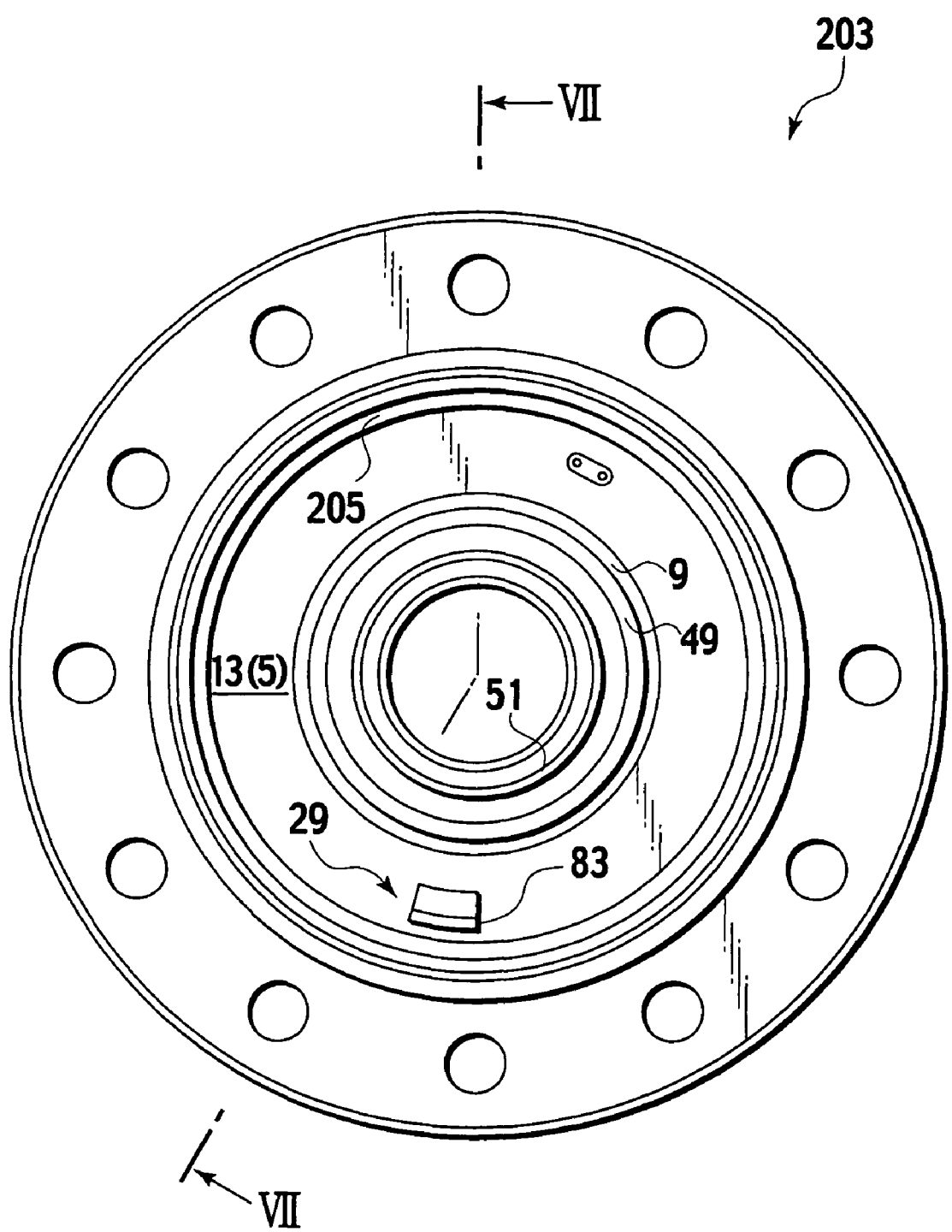
FIG. 8 is a side view of the differential device viewed from the left of FIG. 7.

A third embodiment as illustrated in FIGS. 7 and 8 also embodies the present invention. In the following description, substantially the same elements as any of the aforementioned elements are referred with the same numerals and detailed descriptions thereof will be omitted or simplified.

Referring to FIGS. 7 and 8, a differential device 203 in accordance with the second embodiment of the present invention is provided with a clutch device 201 and a differential gear set 33, differential motion of which is controlled by the clutch device 201, and a controller (not shown) for controlling the clutch device 201.

The differential gear set 33 is provided with a differential case 7 supported by a differential carrier 27 with bearings 35 intervening therebetween, pinion shafts 37 supported by the differential case 7, pinion gears 41 rotatably supported by the pinion shafts 37, and a pair of side gears 43 and 45 engaging with the pinion gears 41. The differential gear set 33 differentially distribute a driving force given to the differential case 7 to left and right axles respectively in splined engagement with the left and right side gears 43 and 45.

The clutch device 201 in accordance with the third embodiment is provided with an anti-rotating solenoid 5, an axially movable plunger 9 driven by the solenoid 5, and a dog clutch 11 operated by the plunger 9. The solenoid 5 is provided with a core 13 incompletely enclosing a winding of the solenoid 5 and radially spanning a support portion 17 of the differential case 7 and the plunger 9. The core 13 in combination with the differential case 7 and the plunger 9 substantially completely encloses the winding to generate a magnetic flux 15 taking a form of a loop therethrough. When the solenoid 5 is excited, the magnetic flux 15 drives the plunger in the axial direction to drive the dog clutch 11 from a disengaging state into an engaging state, in which the differential motion of the differential gear set 33 is locked.

The differential case 7 has a support portion 17 which slidingly fits on and supports the core 13 of the solenoid 5 in a radial direction. Anti-rotation members 29 respectively having latching pieces 83 are spot-welded with the core 13 and the latching pieces 83 latch with recesses 84 formed on the differential carrier 27 so that the solenoid 5 is made anti-rotated.

A support means 205 projects inward from the support portion 17 of the differential case 7, which has a circular slit 207 for fixingly engaging with the support means 205. The support means 205 is a snap ring made of a nonmagnetic material such as stainless steel so as not to prevent leakage of the magnetic flux. However, the support means 205 may be made of a magnetic material such as steel for conducting the magnetic flux in part to a second flux path. The core 13 is supported in the axial direction by means of the fixingly projecting support means 205.

When the solenoid 5 is excited, the generated magnetic flux 15 drives the plunger 9 in the axial direction to drive the dog clutch 11 from a disengaging state into an engaging state. Thereby, the differential motion of the differential gear set 33 is locked. Then a cam 63 converts torque of the differential case 7 into an axial force for pressing a clutch ring 53 toward the left side gear 43 so that the engagement of the dog clutch 11 is prevented from being cancelled by shock or such. When excitation is cancelled, a return spring 65 returns the plunger 9 leftward in FIG. 1 so that the engagement of the dog clutch 11 and the lock of the differential motion are cancelled.

Fourth Embodiment

Figure 10:
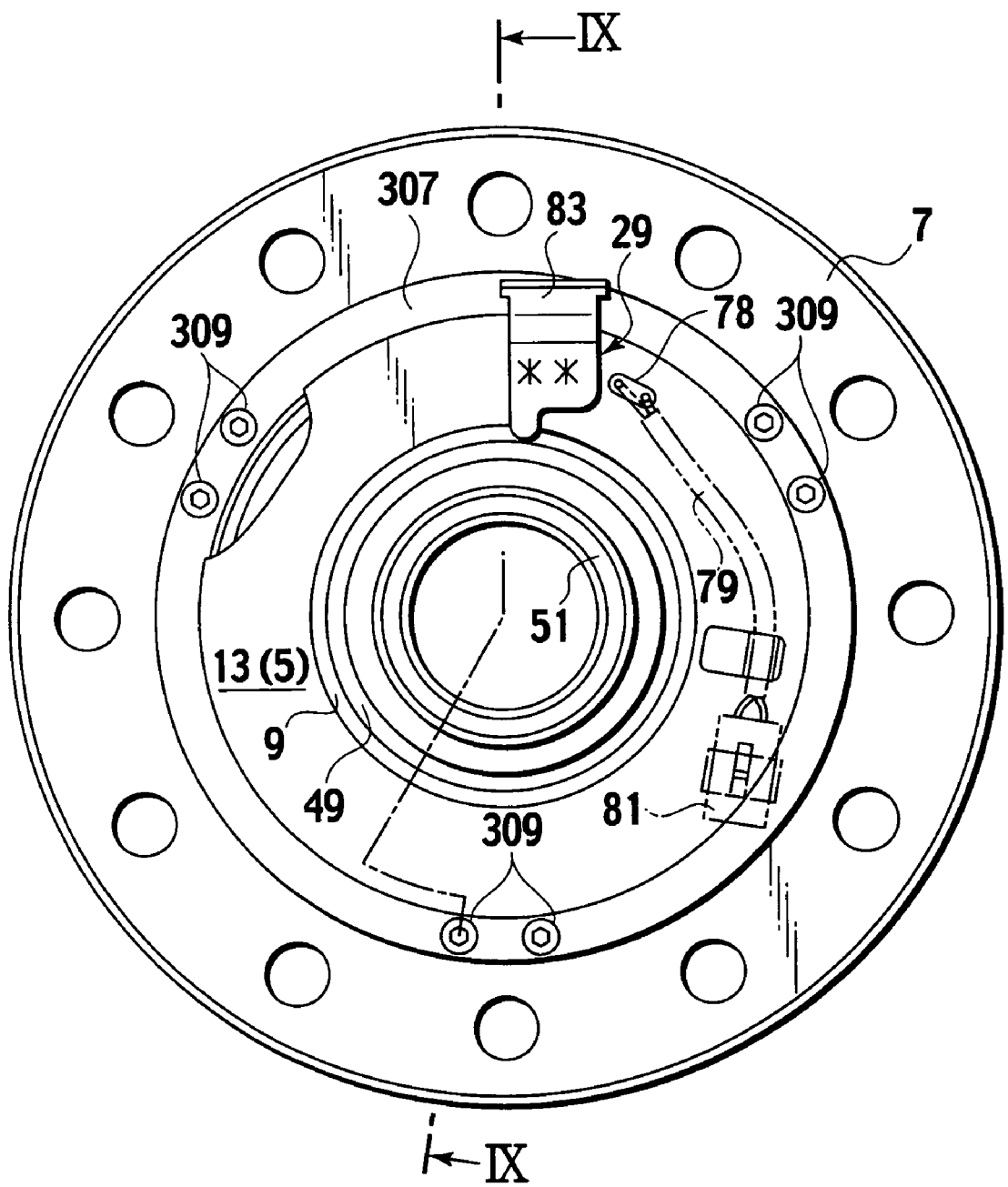
FIG. 10 is a side view of the differential device in accordance with a fourth embodiment of the present invention, as being viewed from the left of FIG. IX-IX.

A fourth embodiment as illustrated in FIGS. 9A, 9B and 10 also embodies the present invention. In the following description, substantially the same elements as any of the aforementioned elements are referred with the same numerals and detailed descriptions thereof will be omitted or simplified.

Referring to FIGS. 9A, 9B and 10, a differential device 303 in accordance with the fourth embodiment of the present invention is provided with a clutch device 301 and a differential gear set 33, differential motion of which is controlled by the clutch device 301, and a controller (not shown) for controlling the clutch device 301.

The differential gear set 33 is provided with a differential case 7 supported by a differential carrier with bearings intervening therebetween (not shown), pinion shafts 37 supported by the differential case 7, pinion gears 41 rotatably supported by the pinion shafts 37, and a pair of side gears 43 and 45 engaging with the pinion gears 41. The differential gear set 33 differentially distribute a driving force given to the differential case 7 to left and right axles respectively in splined engagement with the left and right side gears 43 and 45.

The clutch device 301 in accordance with the fourth embodiment is provided with an anti-rotating solenoid 5, an axially movable plunger 9 driven by the solenoid 5, and a dog clutch 11 operated by the plunger 9. The solenoid 5 is provided with a core 13 incompletely enclosing a winding of the solenoid 5 and radially spanning a support portion 17 of the differential case 7 and the plunger 9. The core 13 in combination with a side wall of the differential case 7 and the plunger 9 substantially completely encloses the winding to generate a magnetic flux 15 taking a form of a loop therethrough. When the solenoid 5 is excited, the magnetic flux 15 drives the plunger in the axial direction to drive the dog clutch 11 from a disengaging state into an engaging state, in which the differential motion of the differential gear set 33 is locked.

The differential case 7 has a support portion 17 which slidingly fits on and supports the core 13 of the solenoid 5 in a radial direction. An anti-rotation member 29 having a latching piece 83 is spot-welded with the core 13 and the latching piece 83 latches with a recess 84 formed on the differential carrier 27 so that the solenoid 5 is made anti-rotated.

A support means 305 is provided for supporting the core 13 in the axial direction. The support means 305 is provided with a ring 307 for contacting the core 13 and bolts 309 for fixation of the ring 307 to the differential case 7. Correspondingly, the core 13 is provided with a projection 311 projecting outward along an outer periphery of the core 13. The projection 311 engages with the ring 307 so that the core 13 is supported in the axial direction.

The ring 307 is made of a magnetic material such as steel for routing the magnetic flux in part to the ring 307. Thereby, the magnetic flux 15 generated by the solenoid 5 branches into two flux paths around the projection 311, namely a first flux path 313 directly conducted into the portion 31 of the differential case 7 and a second flux path 315 routed through the ring 307. Both flux paths 313 and 315 are merged at the portion 31 and the merged flux penetrates the plunger 9. Whole of the flux takes a form of a loop, which partly branches, as shown in FIG. 9B.

Both the first and second flux paths 313 and 315 generate forces acting on the solenoid 5. The first flux path 313 generates a force on the solenoid 5 toward the differential case 7 (rightward in FIG. 9B) and the second flux path 315 generates a force on the solenoid 5 toward the ring 307 (leftward in FIG. 9B). As these countered forces are cancelled with each other, the solenoid 5 is stabilized in the axial direction. Stability of the solenoid 5 leads to minimization of fluctuation in the magnetic flux 15. More specifically, the support means 305 in accordance with the present fourth embodiment also functions as a canceling means for the magnetic forces on the solenoid 5.

When the solenoid 5 is excited, the generated magnetic flux 15 drives the plunger 9 in the axial direction to drive the dog clutch 11 from a disengaging state into an engaging state. Thereby, the differential motion of the differential gear set 33 is locked. Then a cam 63 converts torque of the differential case 7 into an axial force for pressing a clutch ring 53 toward the left side gear 43 so that the engagement of the dog clutch 11 is prevented from being cancelled by shock or such. When excitation is cancelled, a return spring 65 returns the plunger 9 leftward in FIG. 1 so that the engagement of the dog clutch 11 and the lock of the differential motion are cancelled.

Fifth Embodiment

A fifth embodiment will be described hereinafter with reference to FIGS. 11A through 12B. In the following description, substantially the same elements as any of the aforementioned elements are referred with the same numerals and detailed descriptions thereof will be omitted or simplified. In the present embodiment, a clutch device is used to control transmission of a driving force to a differential gear set, whereas the above embodiments use clutch devices to lock and unlock differential motion of differentials.

Figure 11A:
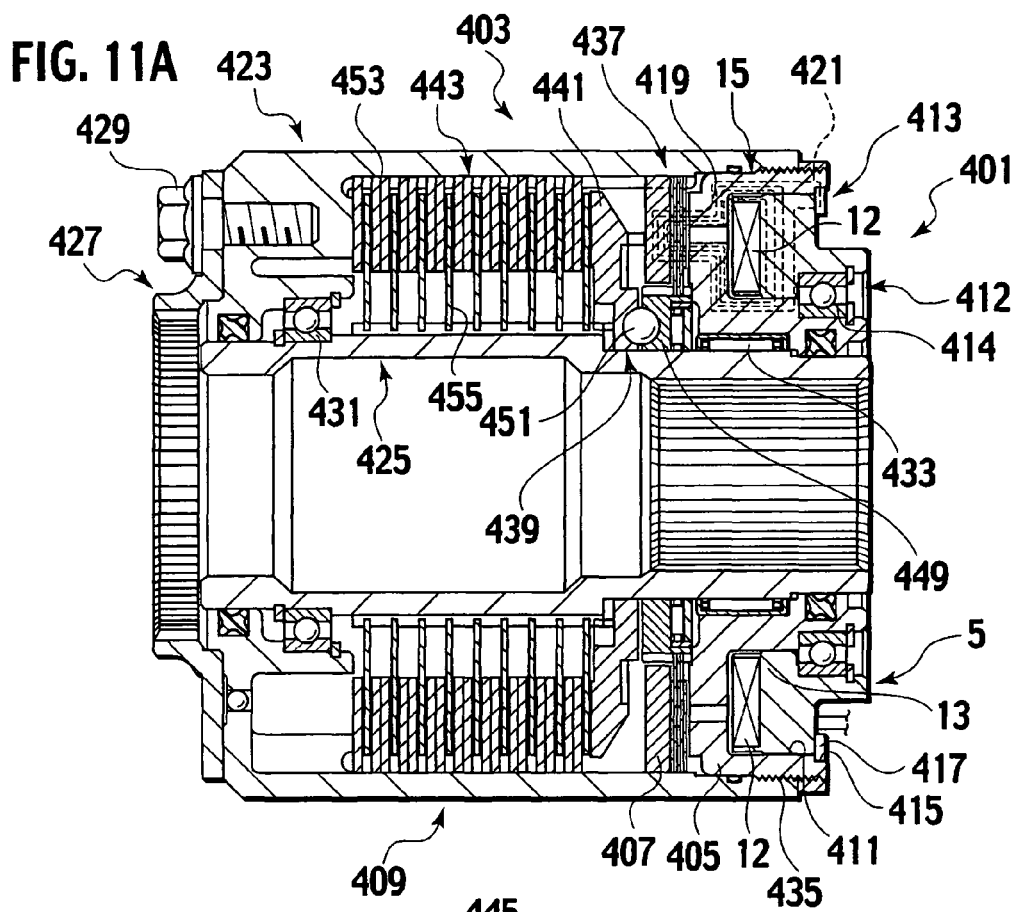
FIGS. 11A and 11B are sectional views of a differential device in accordance with a fifth embodiment of the present invention, where FIG. 11A merely shows a clutch device thereof and FIG. 11B merely shows a solenoid and its proximity.
Figure 11B:
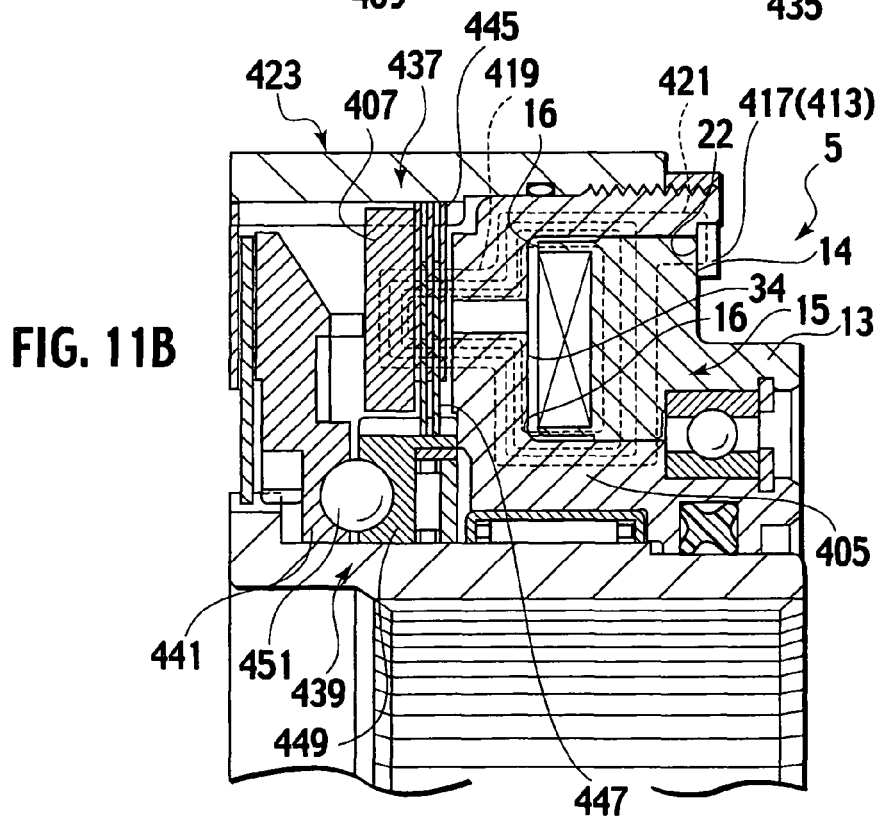

Referring to FIGS. 11A and 11B, in accordance with the fifth embodiment, a clutch device 401 is applied to a differential device 403 of, but not limited to, a coupling type to differentially distribute a driving force given to a case 423 to both axles via a hub 425.

The clutch device 401 in accordance with the fifth embodiment is provided with an anti-rotating solenoid 5, a rotor 405 rotatably fitting on the solenoid 5, a rotatable and axially-movable armature 407 driven in the axial direction by the solenoid 5, a clutch assembly 409 controlled by the armature 407 to controllably transmit the driving force given to the case 423 to the hub 425.

The case 423 is rotatably supported by a differential carrier with bearings intervening therebetween for smooth rotation (not shown). A flange 427 is fixed with the case 423 by means of bolts 429 tightened thereto, through which the case 423 receives a driving force from the engine to rotate. An internal surface of the case 423 is splined so as to drivingly support a plurality of clutch plates 445 of the clutch assembly 409, which is to transmit the driving force when engaged. The case 423 and the rotor 405 are fixed with each other by means of fixing portion 435 so as to unitarily rotate. The hub 425 is rotatably supported by the case 423 and the rotor 405 with bearings 431 and 433 intervening therebetween.

As magnified in FIG. 11B, the solenoid 5 is provided with a winding 12 for generating magnetic flux 15 and a core 13 for conducting the magnetic flux 15. The core 13 incompletely encloses the winding and radially spans from an inner side to an outer side thereof. The rotor 405 fits on both sides of the solenoid 5 and has a gap separating an inner side and an outer side thereof. Interposing plates 445 and 447 of a pilot clutch 437, the armature 407 faces the rotor 405 and the gap. As the core 13, the rotor 405 and the armature 407 are in such a dimensional relation, the magnetic flux 15 takes a form of a substantial loop via the core 13, the rotor 405 and the armature 407 as illustrated with broken lines in FIG. 11B.

An internal surface of the rotor 405 facing inward has a support portion 411. Further as a support means 412, a bearing 414 intervenes between the core 13 and the rotor 405. Both the support portion 411 and the support means 412 are to support the core 13 in the radial direction and allow relative rotation between the core 13 and the rotor 405.

A support means 413 is provided for supporting core 13 in the axial direction. The support means 413 is provided with a ring 417 engaged with a circular slit 415 of the rotor 405 and a portion 22 thereof is in contact with a portion 14 of the core 13. Thereby the core 13 is supported in the axial direction. The ring 417 is made of a magnetic material for routing the magnetic flux in part. Thereby, the magnetic flux 15 generated by the solenoid 5 branches into two flux paths around the ring 417, namely a first flux path 419 directly conducted from the core 13 to the rotor 405 and a second flux path 421 routed through the ring 417. The first flux path 419 is mainly conducted through a direct sliding contact portion between the core 13 and the rotor 405 but in part gets over a narrow gap between ends 16 and ends 34. Both flux paths 419 and 421 are merged in the outer portion of the rotor 405. Whole of the flux substantially takes a form of a loop, which partly branches.

Both the first and second flux paths 419 and 421 generate forces acting on the solenoid 5. The first flux path 419 generates a force on the solenoid 5 toward the rotor 405 (leftward in FIG. 11B) and the second flux path 421 generates a force toward the ring 417 (rightward in FIG. 11B). As these countered forces are cancelled with each other, the solenoid 5 is stabilized in the axial direction. Stability of the solenoid 5 leads to minimization of fluctuation in the magnetic flux 15. More specifically, the support means 413 in accordance with the present fifth embodiment also functions as a canceling means for the magnetic forces on the solenoid 5.

The clutch assembly 409 is provided with the pilot clutch 437 to be engaged by the combination of the solenoid 5 and the armature 407, a cam assembly 439 generating a thrust force when the pilot clutch 437 is engaged, and a main clutch 443 actuated by the cam assembly 439. Both the pilot clutch 437 and the main clutch 443 are, but not limited to, so-called multi-plate clutches.

The pilot clutch 437 is provided with the plurality of outer clutch plates 445 in splined engagement with the case 423, and a plurality of inner clutch plates 447 drivingly coupled with a cam ring 449 fitting on the hub 425. The clutch plates 445 and 447 intervene between the rotor 405 and the armature 407 as mentioned above. The cam assembly 439 is provided with the cam ring 449 drivingly coupled with the inner clutch plates 447, a pressure ring 441 for transmission of the thrust force, and a cam ball 451 intervening therebetween.

As the outer clutch plates 445 rotate with the case 423, friction of the pilot clutch 437 differentiates rotational speed of the cam ring 449 from that of the pressure ring 441 when the pilot clutch 437 is engaged. The differential in rotational speed causes the cam ball 451 to generate the thrust force for pressing the pressure ring 441 toward the main clutch 443.

The main clutch 443 is provided with a plurality of outer clutch plates 453 in splined engagement with the case 423, and a plurality of inner clutch plates 455 in splined engagement with the hub 425. The main clutch 443 is engaged when the pressure ring 441 actuated by the pilot clutch 437 applies an engagement force on the main clutch 443. The engaged main clutch 443 is capable of transmitting the driving force of the case 423 to the hub 425. A degree of transmission of the driving force depends on the engagement force on the main clutch 443 and is hence controllable by a current applied on the solenoid 5.

Modifications of the canceling means may occur and a clutch device 501 including a canceling means 513 in accordance with one of such modified versions will be described hereinafter with reference to FIGS. 12A and 12B.

The clutch device 501 is provided with a canceling means 513, which is composed of an extended outer end 511 of the rotor 405, a groove 509 formed in the proximity of the end 511, and a chamber 507 defined by the groove 509 and the outer periphery of the core 13. Existence of the chamber 507 makes the magnetic flux 15 branch into a first flux path 503 directly conducted to the core 13 and a second flux path 505 routed beyond the groove 509 through an edge 36 of the end 511 to an end 14 of the core 13. The first flux path 503 generates a force on the solenoid 5 leftward in FIG. 12B and the second flux path 505 generates a force toward the end 511 (rightward in FIG. 12B). Cancellation of these countered forces leads to stability of the solenoid 5 in the axial direction and also minimization of fluctuation in the magnetic flux 15.

Sixth Embodiment

A sixth embodiment will be described hereinafter with reference to FIGS. 13-16.

A differential device 601 in accordance with the sixth embodiment is provided with a differential gear set 535 and a clutch device 603. A differential case 539 of the differential gear set 535 is provided with an outer differential case 605 for receiving a driving force from an engine and an inner differential case 607 drivingly coupled with gears therein. The clutch device 603 is to control transmission of the driving force from the outer differential case 605 to the inner differential case 607. Unless the clutch device 603 transmits the driving force, the inner differential case 607 is freely rotatable so as to reduce a load on the engine. Merely when the clutch device 603 transmits the driving force, the differential gear set 535 transmits and differentially distributes the driving force to left and right side gears 531 and 533. Whole of the differential device 601 is rotatably supported by and housed in a carrier, however, the carrier is not shown in the drawings.

Figure 13:
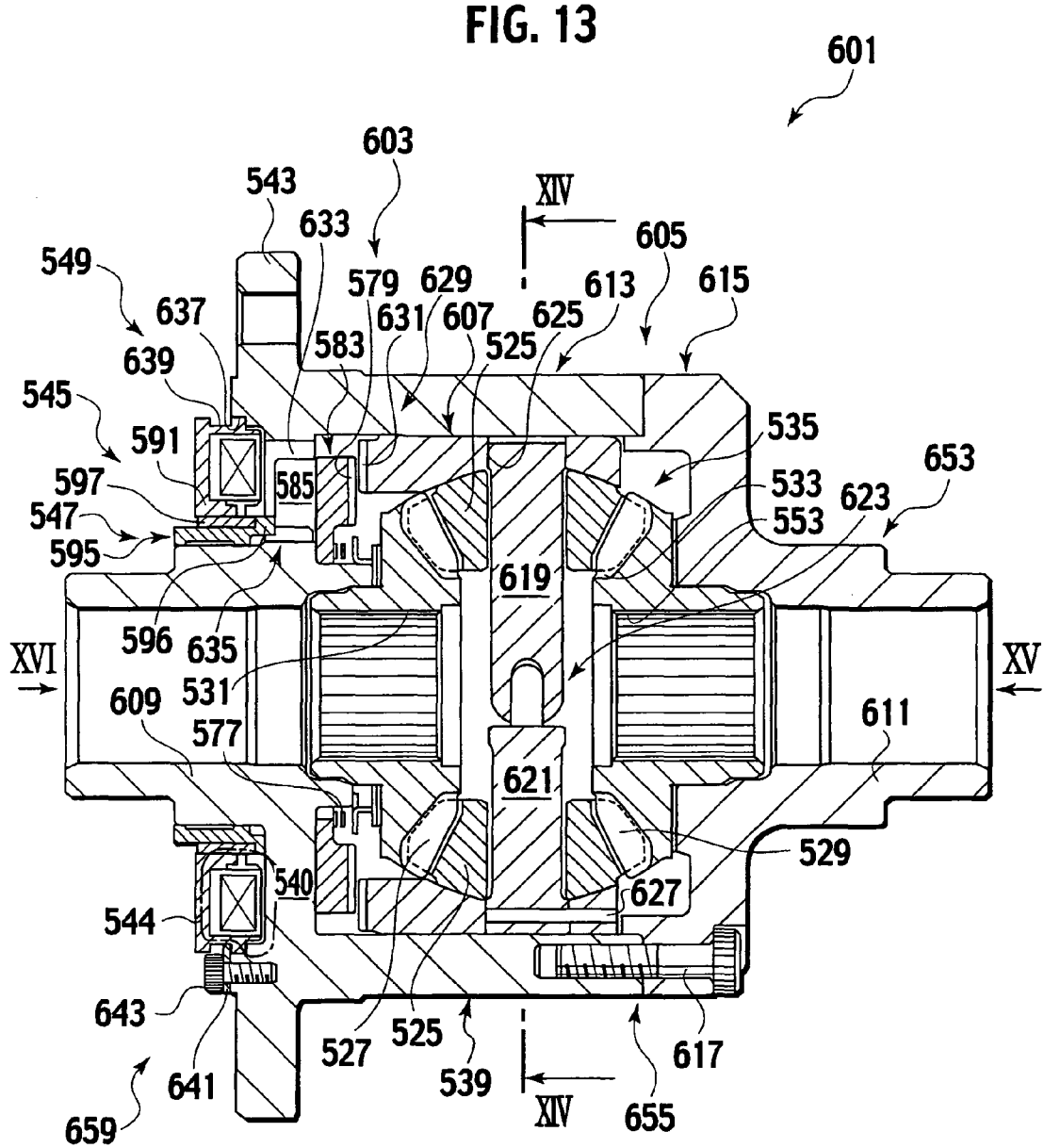
FIG. 13 is a sectional view of a differential device in accordance with a sixth embodiment of the present invention, which is drawn as correspondent to FIG. 1.

Referring to FIG. 13, the clutch device 603 is generally composed of an actuator 549 and a dog clutch 629 operated by the actuator 549. The actuator 549 is provided with an anti-rotating solenoid 545, and an axially movable plunger 547 driven by the solenoid 545. The solenoid 545 generates a magnetic flux 544 penetrating a core 591 thereof into the plunger 547, when excited. The plunger 547 is thereby driven in the axial direction to drive the dog clutch 629 from a disengaging state into an engaging state. The dog clutch 629 in the engaging state transmits the driving force from the outer differential case 605 to the inner differential case 607.

One end of the differential case 539 is formed to have a support portion 637 so dimensioned as to fit with and support the core 591 of the solenoid 545 in the radial direction. The differential case 539 has a support means 659 composed of plural (three in this example) sets of plates 641 for engagement with the solenoid 545, and pair of bolts 643 for fixation of the plates 641 to the differential case 539. The core 591 has a circular slit 639, on which the engagement of the plates 641 is made. The fixation of the plates 641 to the differential case 7 may be made by welding instead of the bolts 23.

Figure 16:
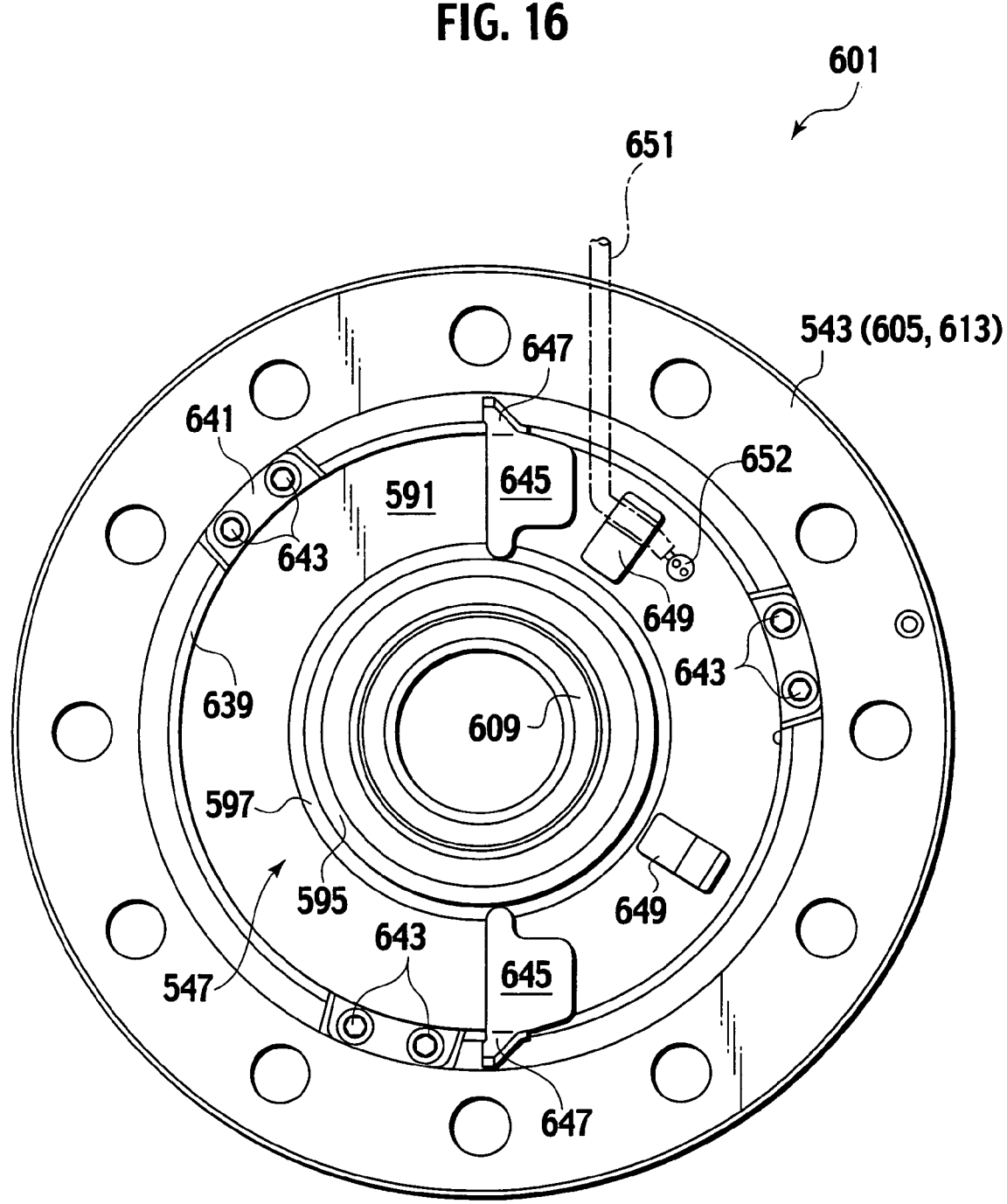
FIG. 16 is a side view of the differential device viewed along an arrow XVI of FIG. 13.

Referring to FIG. 16, the core 591 has anti-rotation members 645 for anti-rotation of the solenoid 545, which are spot-welded with the core 591. Each anti-rotation member 645 has a latching piece 647 projecting obliquely outward in the radial direction. Latching pieces 647 respectively latch with recesses formed on the carrier so that the solenoid 545 is made anti-rotated.

Referring again to FIG. 13, the core 591 incompletely encloses a winding of the solenoid 545 and radially spans the support portion 637 of the differential case 539 and the plunger 547. Thereby, the magnetic flux 544 generated by the solenoid 545 is conducted via the core 591 to a portion 540 of a side wall of the differential case 7, where the solenoid 545 adjoins, and the plunger 547 so as to takes a form of a loop as shown in FIG. 13. In the strict sense, where an end of the core 591 adjoins the support portion 637, the magnetic flux 544 branches into two flux paths, namely a first flux path via an outwardly projecting end of the core 591 to an inner end of the plate 641 and a second flux path via an axial end of the core 591 to an end face of the differential case 539.

The differential gear set 535 is provided with the differential case 539 composed of the outer differential case 605 and the inner differential case 607, a pinion shafts 619 and 621, four pinion gears 525 rotatably supported by the pinion shafts 619 and 621, and left and right side gears 531 and 533.

Figure 15:
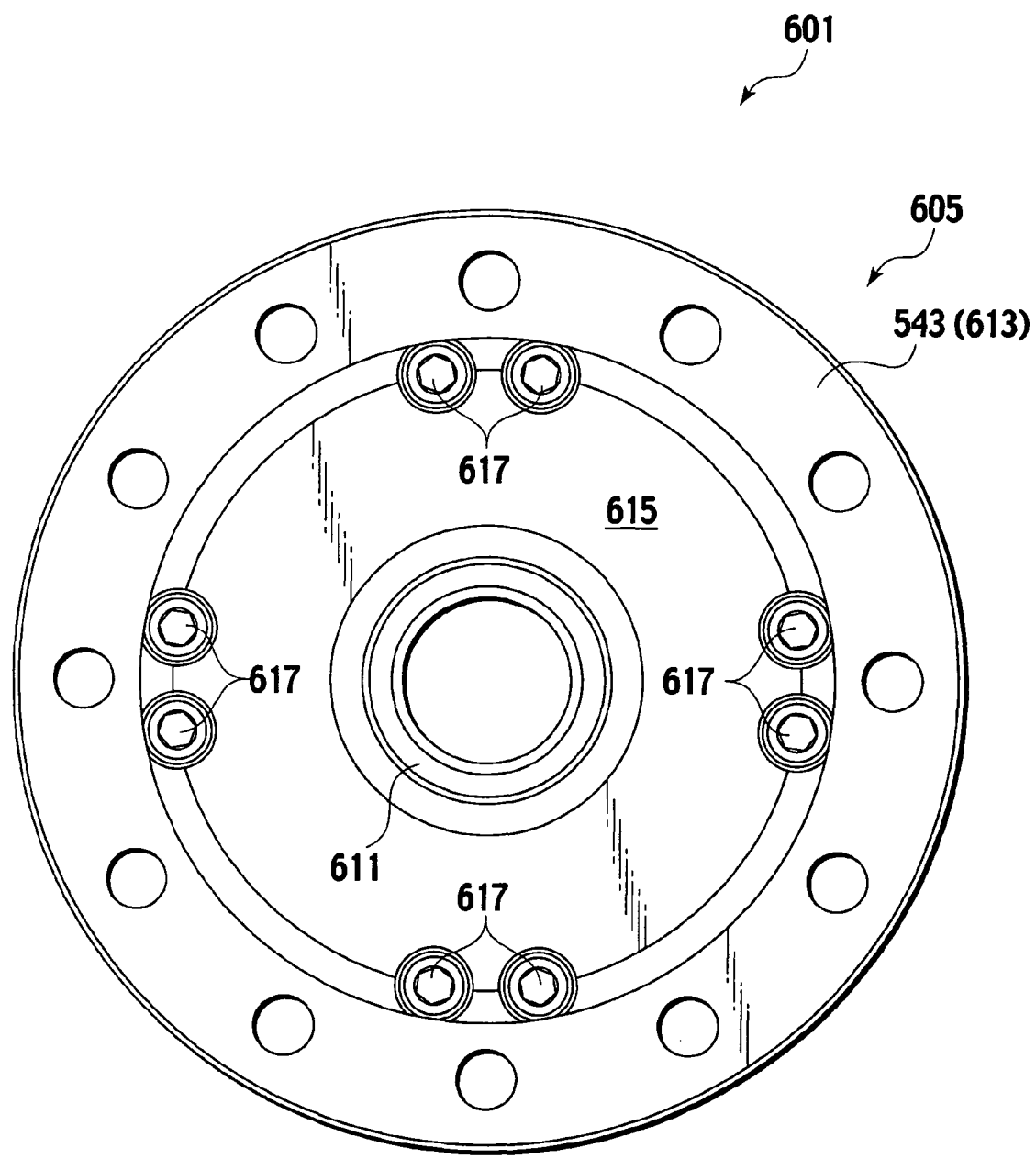
FIG. 15 is a side view of the differential device viewed along an arrow XV of FIG. 13.

The outer differential case 605 is provided with left and right boss portions 609 and 611 for being supported by the carrier. Intervening between the boss portions 609 and 611 and the carrier, bearings are provided for smooth rotation and receiving a thrust force. The outer differential case 605 is further provided with a flange 543 with bolts holes, with which a ring gear (not shown) is fixed to receive a driving force from the engine. The outer differential case 605 is capable of being separated at a portion 655 and hence divided into a main body 613 and an end cover 615, so as to allow access to the interior from the exterior for installation of components therein. The main body 613 and the end cover 615 are fixed by tightened bolts 617 as shown in FIGS. 13 and 15.

Figure 14:
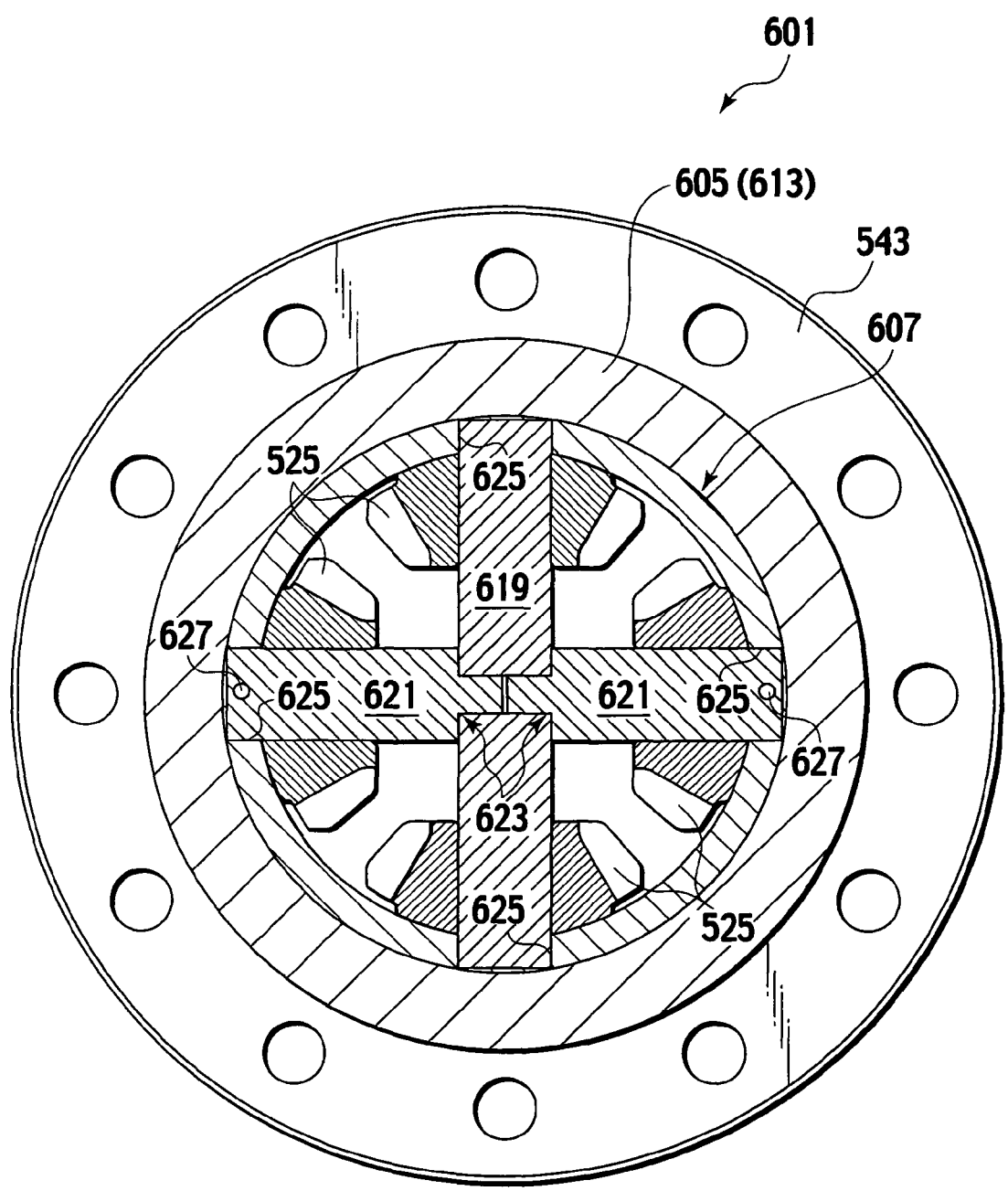
FIG. 14 is a side view of the differential device viewed from the right of FIG. 13, which partly shows a section taken from a line XIV-XIV of FIG. 13.

Referring to FIG. 14 in combination with FIG. 13, the pinion shaft 619 crosses the inner differential case 607 and both ends thereof are fixed by engagement with openings 625 of the inner differential case 607. The pinion shafts 621 are provided in pair and radially inwardly projects from the inner differential case 607. Outer ends of the pinion shafts 621 are respectively prevented from displacing by spring pins 627. The pinion shafts 619 and 621 are interlinked at linkage portions 623 and are perpendicular to each other. The side gears 531 and 533 respectively have engagements 527 and 529 with the pinion gears 525 and have internal splines 553 for splined engagement with left and right axles. Thereby, when the clutch device 603 transmits the driving force to the inner differential case 607, the differential gear set 535 differentially distributes the driving force to the left and right axles via the side gears 531 and 533.

The plunger 547 is composed of a main body 597 directly fitting on and being actuated by the solenoid 545, and a ring 595 made of a non-magnetic material intervening between the main body 597 and the left boss portion 609. The main body 597 and the ring 595 movably fit on the left boss portion 609 and unitarily movable in the axial direction. By non-magnetism of the ring 595, the magnetic flux 544 is prevented from leaking to the left boss portion 609. The ring 595 has three projections 596 projecting in the axial direction toward the differential gear set 535. Correspondingly the outer differential case 605 has three openings 633, to which the projections 596 are slidably inserted. Engagement between the projections 596 and the openings 633 makes the ring 595 rotate unitarily with the outer differential case 605.

As facing to an end of the inner differential case 607, a clutch ring 583 having teeth 579 is provided. Correspondingly the end of the inner differential case 607 is provided with teeth 631. These teeth 579 and 631 compose the dog clutch 629 for transmission of the driving force from the outer differential case 605 to the inner differential case 607. The clutch ring 583 is axially movably supported on an outer periphery of an inwardly projecting portion of the left boss portion 609. The clutch ring 583 is provided with projections 585 correspondently to the projections 596 of the ring 595, which also slidably engage with the openings 633 of the outer differential case 605 so that the clutch ring 583 is rotated unitarily with the outer differential case 605.

As the projections 585 respectively face to the projections 596, axial motion of the plunger 547 toward the dog clutch 629 (rightward in FIG. 13) is transmitted to the dog clutch 629 via the butted projections 585 and 596 so that the dog clutch 629 is made engaged.

Side faces of the projections 585 and the openings 633 are correspondently obliquely formed so that a combination of the projections 585 and the openings 633 composes a cam 635 to convert torque of the outer differential case 605 into an axial force on the clutch ring 583. The axial force assists the engagement of the dog clutch 629. As opposed to the engagement force on the dog clutch 11, a return spring 577 repulsively intervenes between the clutch ring 583 and the left side gear 531.

Referring again to FIG. 16, a lead line 651 is led out of the solenoid 545 via a tight plug 652 and fixed with the core 591 by means of a clip 649. The lead line 651 is further conducted out of the carrier to link with a battery via an external controller. Thereby, the controller is capable of controlling excitation of the solenoid 545.

When the solenoid 545 is excited, the generated magnetic flux 544 drives the plunger 547 in the axial direction to drive the dog clutch 629 from a disengaging state into an engaging state. Then the differential device 601 transmits and differentially distributes the driving force of the engine to both axles. Then the cam 635 converts torque of the outer differential case 605 in to an axial force for pressing the clutch ring 583 toward the inner differential case 607 so that the engagement of the dog clutch 629 is prevented from being cancelled by shock or such. When excitation is cancelled, the return spring 577 returns the plunger 547 leftward in FIG. 13 so that the engagement of the dog clutch 629 is cancelled. Then the differential device 601 allows the axles to freely run and hence reduces a load on the engine.

Seventh Embodiment

A seventh embodiment of the present invention will be described hereinafter with reference to FIG. 17. In the following description, substantially the same elements as any of the aforementioned elements are referred with the same numerals and detailed descriptions thereof will be omitted or simplified.

Figure 17:
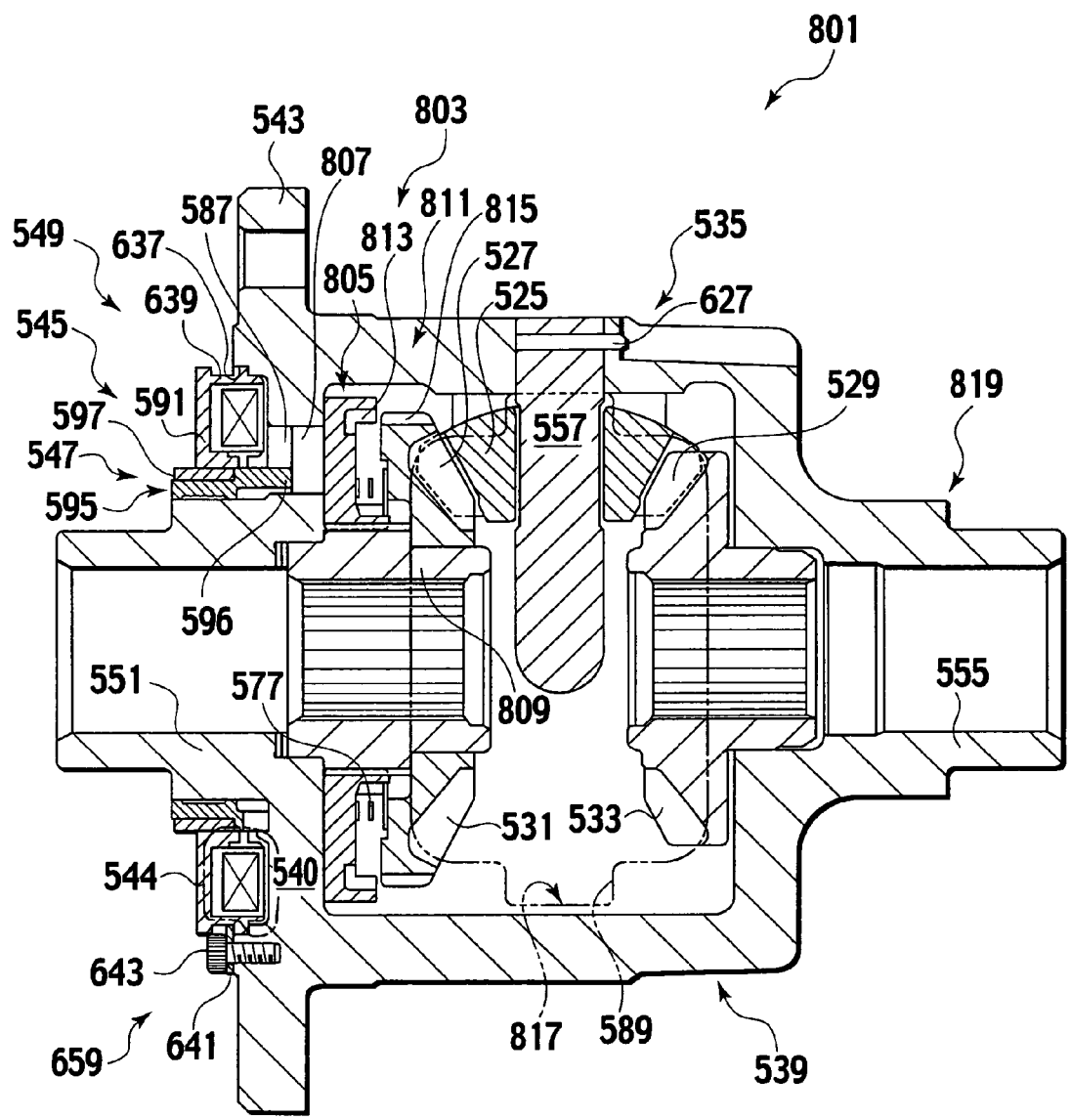
FIG. 17 is a sectional view of a differential device in accordance with a seventh embodiment of the present invention, which is drawn as correspondent to FIG. 1.

Referring to FIG. 17, a differential device 801 in accordance with the seventh embodiment of the present invention is provided with a clutch device 803 and a differential gear set 535, differential motion of which is controlled by the clutch device 803, and a controller (not shown) for controlling the clutch device 803.

The differential gear set 535 is provided with a differential case 539 supported by a differential carrier with bearings intervening therebetween, pinion shafts 557 supported by the differential case 539, pinion gears 525 rotatably supported by the pinion shafts 557, and a pair of side gears 531 and 533 engaging with the pinion gears 525. The differential gear set 535 differentially distribute an driving force given to the differential case 539 to left and right axles respectively in splined engagement with the left and right side gears 531 and 533.

The clutch device 803 in accordance with the seventh embodiment is generally composed of an actuator 549 having an anti-rotating solenoid 545 and an axially movable plunger 547, and a dog clutch 811 operated by the actuator 549. The solenoid 545 is provided with a core 591 incompletely enclosing a winding of the solenoid 545 and radially spanning a support portion 637 of the differential case 539 and the plunger 547. The core 591 in combination with a side wall of the differential case 539 and the plunger 547 substantially completely encloses the winding to generate a magnetic flux 544 taking a form of a loop therethrough. Intervening between the plunger 547 and the dog clutch 811, a mediating member 807 is provided to transmit a motion of the plunger 547 to the dog clutch 811. When the solenoid 545 is excited, the magnetic flux 544 drives the plunger in the axial direction to drive the dog clutch 811 from a disengaging state into an engaging state, in which the differential motion of the differential gear set 535 is locked.

The differential case 539 has a support portion 637 which slidingly fits on and supports the core 591 of the solenoid 545 in a radial direction. Anti-rotation members respectively having latching pieces (not shown) latch with recesses formed on the differential carrier so that the solenoid 545 is made anti-rotated.

The differential case 539 has an opening 589 (shown by a two-dotted chain line in FIG. 17) for installation of interior components, such as the dog clutch and the gears. A longitudinal diameter 817 of the opening 589 is made greater than a diameter of the clutch ring 805, which is the greatest in diameter among the interior components. More specifically, the opening 589 is so dimensioned as to allow insertion of any of the interior components.

A support means 659 is provided for supporting the core 591 in the axial direction. The support means 659 is provided with a ring 641 for contacting the core 591 and bolts 643 for fixation of the ring 641 to the differential case 539. Correspondingly, the core 591 is provided with a projection projecting outward along an outer periphery thereof. The projection engages with the ring 641 so that the core 591 is supported in the axial direction.

The dog clutch 801 is composed of a clutch ring 805 having splines 813 and correspondent splines 815 formed on an outer periphery of the left side gear 531. The clutch ring 805 is in axially slidable splined connection with a boss portion 809 of the left side gear 531.

When the solenoid 545 is excited, the generated magnetic flux 544 drives the plunger 547 in the axial direction to drive the dog clutch 811 from a disengaging state into an engaging state. Thereby, the differential motion of the differential gear set 535 is locked. When excitation is cancelled, a return spring 577 returns the plunger 547 so that the engagement of the dog clutch 811 and the lock of the differential motion are cancelled.

Eighth Embodiment

Figure 18:
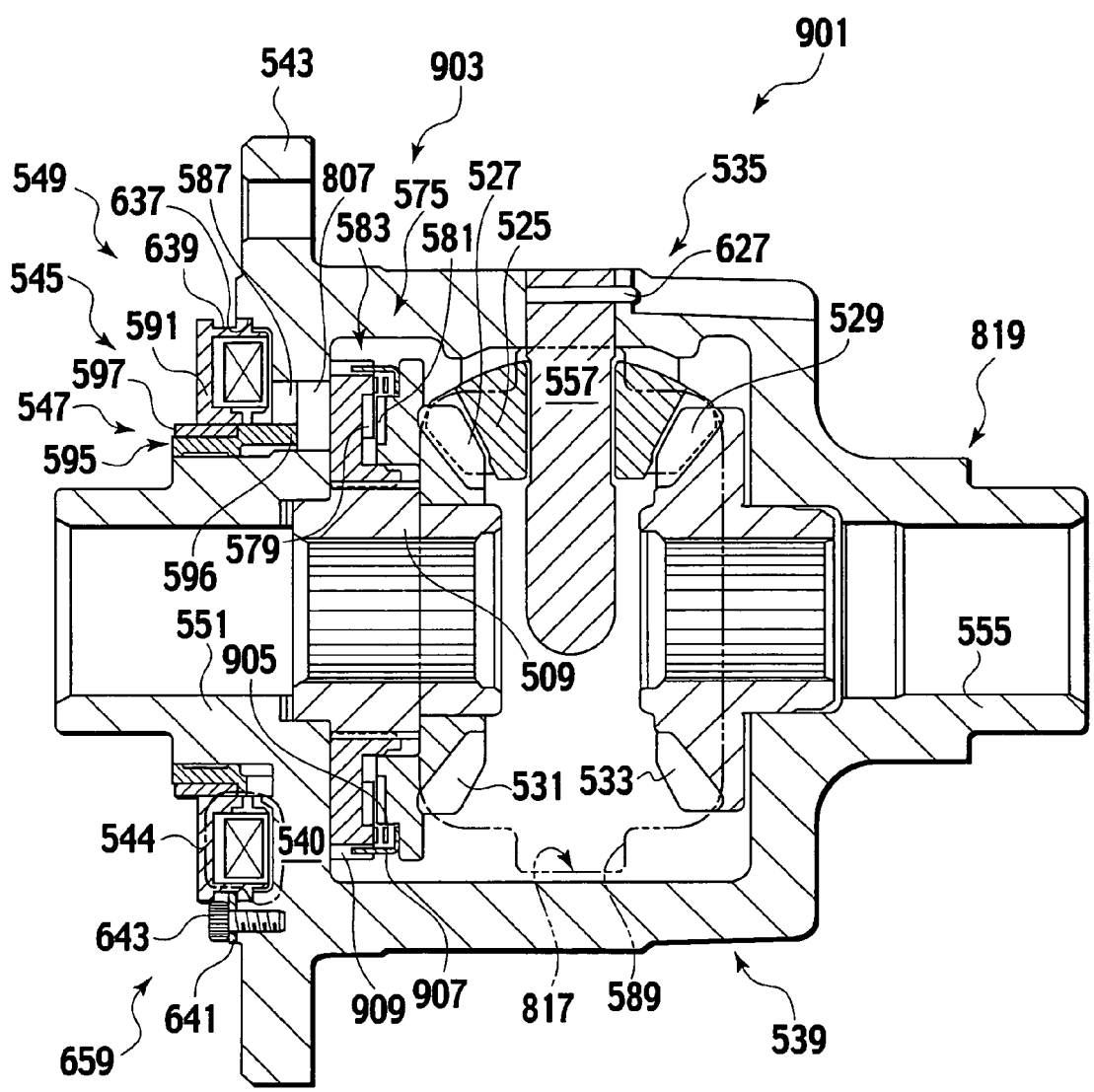
FIG. 18 is a sectional view of a differential device in accordance with an eighth embodiment of the present invention, which is drawn as correspondent to FIG. 1.

The aforementioned differential device 801 in accordance with the seventh embodiment can be modified to be a differential device 901 in accordance with an eighth embodiment as will described hereinafter with reference to FIG. 18.

The differential device 901 differs from the aforementioned differential device 801 in changes in a clutch device 903 as compared with the clutch device 803. Instead of the clutch ring 805 having the splines 813, the clutch device 903 has a clutch ring 583 having teeth 579. Further instead of the splines 815 formed on the left side gear 531, teeth 581 are formed on the left side gear 531 as correspondent to the teeth 579. The teeth 579 and the teeth 581 compose a dog clutch 575. A return spring 905 is repulsively interposed between the clutch ring 583 and the side gear 531. A retainer 907 for retaining the return spring 905 is interposed between the side gear 531 and the return spring 905 and anti-rotated by engagement with a notch 909 cut in the clutch ring 583.

In the differential device 901, as with the differential device 801, when the solenoid 545 is excited, the generated magnetic flux 544 drives the plunger 547 in the axial direction via the mediating member 807 to drive the dog clutch 575 into an engaging state to lock a differential motion of the differential gear set 535. When excitation is cancelled, the return spring 905 returns the plunger 547 so that the engagement of the dog clutch 575 and the lock of the differential motion are cancelled.

The aforementioned embodiments of the present invention have many advantages, which at least include the following advantages. In any of the above embodiments, as a portion of the differential gear set (a side wall of a differential case or an armature) is used to compose a part of a magnetic circuit, a solenoid in itself is unnecessary to have all components for closing a loop of a magnetic flux. The number of components of the solenoid is reduced and the solenoid can be disposed closer to the differential gear set to this extent. Thereby, a total size of the differential device is prominently reduced. In particular, a width between the left side wall and a shoulder of a right boss portion (653 in FIG. 13, 819 in FIGS. 17 and 18) is prominently reduced. Further, the magnetic circuit composed of a portion of the side wall, a core and a plunger is formed in such a tightly small form that the magnetic flux path takes a form of a loop tightly around a solenoid and is prevented from leaking outward. This leads to increase in utilization efficiency of the magnetic flux and consequently energy loss is reduced. Further the small energy loss leads to decrease in size of the solenoid, which further leads to compactness of the differential device.

Although the invention has been described above by reference to certain embodiments of the invention, the invention is not limited to the embodiments described above. Modifications and variations of the embodiments described above will occur to those skilled in the art, in light of the above teachings.

What is claimed is:

1. A differential device comprising:
   a differential case rotatable about an axis and axially immovable;
   a differential gear set housed in the differential case, the differential gear set being capable of having links with axles so as to differentially transmit a driving force acting on the differential case to the axles;
   a clutch configured to either limit differential motion of the differential gear set or control transmission of the driving force from the differential case to the differential gear set, the clutch being housed in and rotatable with the different case;
   a plunger configured to disengageably engage the clutch;
   a solenoid configured to generate a magnetic flux for driving the plunger;
   a magnetic core slidably placed in contact with a portion of the differential case and incompletely enclosing the solenoid to expose the solenoid to the portion, the magnetic core in combination with the portion and the plunger being so dimensioned as to surround the solenoid; and
   a support member configured to support the magnetic core to fit with the differential case in an axial direction along the axis,
   wherein the clutch comprises a cam face configured to convert torque of the differential case into axial force on the clutch to assist engagement of the clutch, the cam face being so formed on a side face of the clutch as to butt against a side face of an opening of the differential case to generate the axial force.

2. The differential device of claim 1, wherein the support member includes a latching piece latching with any of the magnetic core and the differential case.

3. The differential device of claim 1, wherein the support member includes a repulsive member to urge the magnetic core toward the differential case.

4. The differential device of claim 1, wherein the solenoid includes an anti-rotating member engagable with an external stationary member to prevent the solenoid from rotating.

5. The differential device of claim 1, wherein the solenoid is so arranged as to deliver the magnetic flux to the portion of the differential case.

6. The differential device of claim 1, wherein the magnetic core and the solenoid are so arranged as to directly face the solenoid to the portion of the differential case in the axial direction.

7. The differential device of claim 1, wherein the support member is so arranged as to branch the magnetic flux into a first flux path and a second flux path so as to cancel forces generated by the first and second flux paths on the solenoid.

8. The differential device of claim 1, wherein the support member is so arranged as to branch the magnetic flux into a first flux path directly conducted to the portion and a second flux path routed to the support member.

9. The differential device of claim 1, wherein the magnetic core includes a projection formed on an outer periphery of the core, the projection having a first end and a second end to branch the magnetic flux into a first flux conducted through the first end and a second flux conducted through the second end.

10. The differential device of claim 1, further comprising:
    a chamber defined by the solenoid and the rotating member to branch the magnetic flux into a first flux conducted through the first end and a second flux conducted through the second end.

11. The differential device of claim 1, wherein the magnetic core is supported in a radial direction by a first section of the differential case and the plunger is supported in the radial direction by a second section of the differential case.

* * * * *